(12) United States Patent
Ijzerman et al.

(10) Patent No.: US 8,300,162 B2
(45) Date of Patent: Oct. 30, 2012

(54) MULTI-VIEW DISPLAY

(75) Inventors: Willem L. Ijzerman, Eindhoven (NL);
Hugo J. Cornelissen, Waalre (NL); Tim Dekker, Eindhoven (NL); Gerardus P. Karman, 'S-Hertogenbosch (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 13/234,626

(22) Filed: Sep. 16, 2011

(65) Prior Publication Data

US 2012/0002120 A1    Jan. 5, 2012

Related U.S. Application Data

(62) Division of application No. 10/573,082, filed on Mar. 23, 2006, now Pat. No. 8,045,069.

(30) Foreign Application Priority Data

Sep. 27, 2003 (GB) .................................. 0322681.8

(51) Int. Cl.
*G02F 1/1335* (2006.01)
(52) U.S. Cl. .......................................................... 349/15
(58) Field of Classification Search ...................... 349/15
See application file for complete search history.

(56) References Cited

U.S. PATENT DOCUMENTS

| | | | |
|---|---|---|---|
| 5,032,828 A | 7/1991 | Hirose et al. | |
| 5,734,358 A | 3/1998 | Sumiyoshi et al. | |
| 5,751,479 A | 5/1998 | Hamagishi et al. | |
| 6,069,650 A | 5/2000 | Battersby | |
| 6,233,003 B1 | 5/2001 | Ono | |
| 6,449,090 B1 | 9/2002 | Omar et al. | |
| 6,466,285 B1 | 10/2002 | Ichikawa | |
| 6,597,418 B2 | 7/2003 | Moon et al. | |
| 6,603,442 B1 * | 8/2003 | Hong | 345/7 |
| 6,603,504 B1 | 8/2003 | Son et al. | |
| 2002/0126389 A1 | 9/2002 | Moseley et al. | |
| 2003/0011884 A1 | 1/2003 | Van Berkel | |

(Continued)

FOREIGN PATENT DOCUMENTS

DE    19737942 A1    3/1999

(Continued)

*Primary Examiner* — Nathanael R Briggs

(57) ABSTRACT

A multi-view display (49) is arranged to provide large viewing zones (23, 24) while producing little or no cross-talk. The display may include a barrier (20) comprising a plurality of color portions (20a, 20b, 20c) that co-operate with color filters (19a-19f) in a display panel (14) to selectively direct light to the viewing zones (23, 24). A lenticular screen (30) may be arranged to create or image light lines onto imaging units (32a, 32f) of the display panel (14) that are spaced from one another, so that adjacent units (32a, 32f) are illuminated by light from different lenses (30a, 30b, 30c), directed towards different viewing zones (23, 24). A light source (35) may generate the light at positions aligned with boundaries between adjacent lenses (30a, 30b, 30c). The imaging units may be operated so that units (32a, 32b) displaying information for the first viewing zone (23) are separated from units (32d, 32e) displaying information for the second viewing zone (24) by units (32c, 32f) not used to display information. Adjacent columns of units (32a, 32b) may be used to display information to one viewing zone (23). The viewing zones (23, 24) may be enlarged using a scatterer (36). A switchable diffuser (40) or barrier (48) may be provided so that the display (49) can operate in different multi-view and/or single view modes.

19 Claims, 14 Drawing Sheets

U.S. PATENT DOCUMENTS

| | | |
|---|---|---|
| 2003/0081156 A1 | 5/2003 | Creemers et al. |
| 2004/0032556 A1 | 2/2004 | Yoon et al. |

FOREIGN PATENT DOCUMENTS

| | | | |
|---|---|---|---|
| EP | 1029730 | A1 | 8/2000 |
| EP | 1143747 | A2 | 10/2001 |
| EP | 1323571 | A2 | 7/2003 |
| GB | 2405545 | A | 3/2005 |
| JP | 8194190 | A | 7/1996 |
| JP | 11205822 | A | 7/1999 |
| JP | 2005078092 | A | 3/2005 |
| WO | 9809842 | A | 3/1998 |
| WO | 9962734 | A | 12/1999 |

* cited by examiner

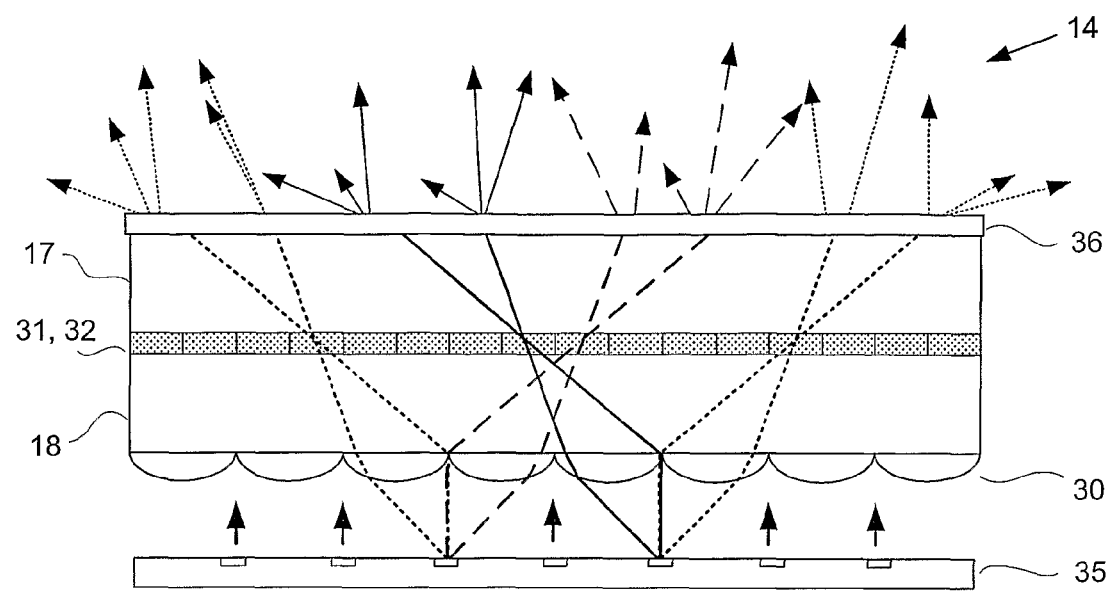
Figure 17
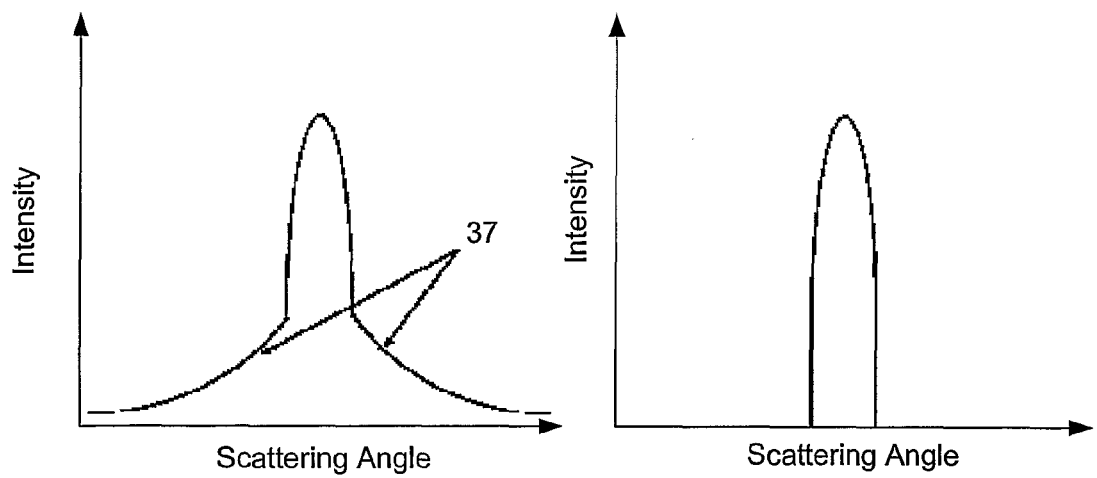
Figure 18a                    Figure 18b

MULTI-VIEW DISPLAY

The present invention relates to display devices arranged to provide multiple views.

A multi-view display may be arranged to present different information to two or more users. FIG. 1 depicts an arrangement in which two views are created by a conventional multi-view display device 1. Such a display 1 may provided in the dashboard area of an automotive vehicle and arranged to present a route planner to the driver 2, while displaying e-mail messages or images from a digital versatile disc (DVD) to one or more passengers 3. The route planner will be visible to the driver 2 if he or she is positioned in a first viewing zone 4, while the passenger 3 can view their information when positioned in a second viewing zone 5.

In the arrangement of FIG. 1, a region 6 is located in between the viewing zones 4, 5, in which both sets of information, that is, the information for display to the driver 2 and information intended for the passenger 3, are visible simultaneously. In other words, in region 6, there is cross-talk between the information displayed in viewing zone 4 and in viewing zone 5. In known multi-view displays, the sizes of the viewing zones 4, 5 are relatively small when compared with the size of the cross-talk region 6. Typically, the opening angles θ of the viewing zones 4, 5 are about 10°. This restricts the positions in which the driver 2 and passenger 3 can view information. In addition, it increases the probability that the driver 2 or passenger 3 will move into a position in the cross-talk region 6.

For an automotive application, the presence of a cross-talk region 6 is particularly undesirable, since a passenger 7 sitting in the middle of a rear bank of seats may be located in this region 6 and be presented with confusing information. Furthermore, for safety reasons, the display 1 should prevent the driver 2 from seeing the information presented to the passenger 3. Therefore, the viewing zones 4, 5 should be physically separate and cross-talk in region 6 minimised.

Conventional methods for creating multiple views are based on similar principles to those used in auto-stereoscopic 3D displays, in which different information is directed to left and right eyes of a viewer. In one prior technique, a lenticular screen 8 is placed in front of a display panel 9, such as a liquid crystal display (LCD), as shown in FIG. 2. The display produces two views 10, 11. Presently available LCD devices have a glass thickness t of 0.7 or 1.1 mm in order to create large viewing angles. A multi-view display based on the arrangement of FIG. 2 is not feasible with such thicknesses. For example, if a display has a subpixel pitch p of 0.042 mm, the light rays emerging from two adjacent subpixels 9a, 9b will be separated by an angle of 4°, irrespective of the strength of the lenses in the lenticular screen 8. This separation is insufficient for a multi-view display. In addition, this type of display creates a cross-talk region that is large in comparison to the viewing zones.

Another conventional method utilises a front barrier 12, positioned in front of the display panel 9, as shown in FIG. 3. The barrier 12 has a plurality of slits 13 that allow light from the display panel 9 to pass through, creating viewing zones 4, 5 and a significantly larger cross-talk region 6. The sizes of the viewing zones 4, 5 depend on the transmission of the barrier 12. For example, if the transmission of the barrier 11 is close to zero, that is, if the slits 13 are of minimal width, the viewing zones 4, 5 have opening angles θ of approximately 40°. However, if the transmission of the barrier 11 is 25%, the opening angles θ are reduced to approximately 10° and the cross-talk region 6 is considerably larger, having an opening angle θ' of approximately 20°. Therefore, in order to produce large viewing zones 4, 5, the transmission of the barrier 12 must be restricted. However, this type of arrangement suffers from poor light efficiency, even when a barrier 12 with a high transmission is used, as a considerable portion of the light emerging from the display panel 9 is blocked.

Another known technique, not depicted, uses a rear barrier, which comprises a plurality of slits and is positioned between the backlight and display panel. This arrangement produces considerable cross-talk due to the finite width of the slits. As discussed in relation to the barrier arrangement of FIG. 3, cross-talk can be reduced by decreasing the width of the slits but this reduces the light efficiency of the display.

In order to create two views that are well separated, at angles of, say, ±30° from normal, the separation between the rear barrier and display panel should be less than p/0.3536, where p is the pitch of the subpixels of the display panel. The separation is usually provided by an intervening sheet of glass. However, as typical subpixel sizes are around 99 μm, this would require a sheet of glass of thickness 280 μm, which is presently unfeasible.

In summary, presently known multi-view display techniques provide viewing zones 4, 5 of limited size, separated by one or more relatively large regions 6 in which there is cross-talk. It is an object of the present to provide a multi-view display that creates two or more viewing zones that are relatively large when compared with prior art displays, in which cross-talk is either avoided or restricted to a relatively small region.

According to a first aspect of the invention, a multi-view display configured to display two or more views directed to two or more respective viewing zones comprises a display panel, comprising a plurality of imaging units and a plurality of colour filters, wherein each of said colour filters is associated with one of said imaging units, the colour filters being arranged according to a first pitch and in a first sequence of colours, and a barrier including a plurality of colour portions comprising colour filter material, the colour portions being arranged according to a second pitch that is substantially equal to twice the first pitch and in a second sequence of colours that corresponds to the first sequence of colours when reversed in order, wherein the barrier is positioned so that light exits the display panel after passing through one colour portion and one of said colour filters and the colour portions of the barrier are configured to cooperate with the colour filters to selectively direct said light to the first and second viewing zones.

The imaging units may be pixels or subpixels or groups thereof.

The second pitch may vary slightly from a value that is twice the first pitch, for example, in order to provide a view point correction or to improve separation between the viewing zones.

The colour portions are arranged in a colour sequence that is reversed with respect to the colour sequence of the colour filters and colour portions are arranged in colour sequences that are reversed with respect to one another. For example, the colour filters may be arranged in a periodic sequence of red, green and blue filters, while the colour portions are arranged in a second periodic sequence of blue, green and red filters.

The colour barrier may be positioned in front of the imaging units, with respect to a viewer, so that light passes through the colour filters before passing through the barrier. Alternatively, the colour barrier may be a rear barrier, positioned behind the imaging units, in which case the colour portions may comprise cholesteric filter material.

The multi-view display may comprise a light source arranged to provide backlighting for the imaging units of the display panel. The light source may comprises a plurality of light emitting diodes, wherein at least two of said light emitting diodes are configured to emit light of first and second colours respectively, in order to facilitate selective transmission of light through the barrier and the colour filters according to colour. Alternatively, where the colour barrier is placed in front of the imaging units, the imaging units may comprise light emissive devices.

The colour portions of the barrier and/or the colour filters may be separated from one another by black matrices.

The colour portions and colour filters may be aligned so that the viewing zones produced by the display are asymmetrically arranged.

This aspect also provides a display system comprising the multi-view display and audio output means arranged to output audio signals corresponding to the information displayed in one or more of said viewing zones.

The display or display system according to this aspect may be arranged to display information to viewers in an automotive vehicle.

According to a second aspect of the invention, a method of manufacturing a multi-view display according to the first aspect of the invention, arranged so that the colour barrier is positioned so that light passes through the colour filters before passing through the barrier, comprises providing a plurality of colour portions on a light transmissive substrate, placing a sheet of light transmissive material over said plurality of colour portions and providing the plurality of colour filters of the display panel on said sheet of light transmissive material.

According to a third aspect of the invention, a method of manufacturing a multi-view display according to the first aspect of the invention, arranged so that the colour barrier is positioned so that light passes through the colour portions before passing through the colour filters, comprises providing said plurality of colour portions on a light transmissive substrate, placing a sheet of light transmissive material over said plurality of colour portions and providing means configured to control said imaging units on said sheet.

In a multi-view display manufactured according to the methods of the second and third aspects, a separation between the colour barrier and the imaging units is determined by the thickness of the sheet. This thickness may be less than that of a typical substrate of a liquid crystal device. The reduction in this separation may contribute to an increase in the sizes of the viewing zones created by the display when compared with prior art arrangements.

According to a fourth aspect of the invention, a multi-view display comprises a display panel, comprising a plurality of imaging units configured with a first pitch, a light source arranged to illuminate the display panel and a lenticular screen arranged to focus light emitted by the light source to create images of light lines at said plurality of imaging units, the lenticular screen comprising a plurality of lenses configured with a second pitch, wherein said second pitch is substantially equal to an integer multiple of said first pitch, so that said lenses create images on two of said imaging units that are spaced apart from one another and adjacent imaging units are illuminated by images created by different lenses.

The light source may be arranged to generate the light lines at positions arranged according to a third pitch, wherein the third pitch is substantially equal to the second pitch. The positions may be aligned with boundaries between adjacent ones of said lenses.

According to a fifth aspect of the invention, a multi-view display comprises a display panel comprising a plurality of imaging units configured with a first pitch, a light source arranged to generate a plurality of light lines at a plurality of positions arranged with a second pitch and a lenticular screen arranged to focus light emitted by the light source to create images of light lines at said plurality of imaging units, the lenticular screen comprising a plurality of lenses configured with a third pitch that is substantially equal to the second pitch and arranged so that boundaries between adjacent lenses are aligned with the positions at which the light lines are generated wherein said second pitch is substantially equal to an integer multiple of said first pitch, so that said lenses create images on two of said imaging units that are spaced apart from one another and adjacent imaging units are illuminated by images created by different lenses.

A multi-view display according to the fourth or fifth aspects may comprise a scatterer arranged to scatter light output by the display panel, to provide a further increase in the sizes of the viewing zones. The scatterer may be a controlled scatterer with a predetermined scattering profile. For example, the scatterer may have a scattering surface comprising periodic structural features.

A multi-view display according to the fourth or fifth aspects may comprise a switchable diffuser and mode switching means configured to switch said diffuser between a diffusive state and a light transmissive state, wherein said diffuser is positioned between the light source and imaging units so that, when the diffuser is in its light transmissive state, the light lines are imaged at the imaging units and, when the diffuser is in its diffusive state, the imaging units are provided with substantially uniform illumination. This permits the display to be switched into a first mode in which the display creates multiple views and a second mode in which the display presents a single view.

The diffuser may be configured to switch between these states in response to the application or removal of an electric field by the mode switching means.

A multi-view display according to the fourth or fifth aspects may be included in a display system, together with audio output means arranged to output audio signals corresponding to the information displayed in one or more of said viewing zones.

According to a sixth aspect of the invention, a multi-view display comprises a display panel, comprising a first plurality of imaging units arranged to display a first view to a first viewing zone and a plurality of second imaging units arranged to display a second view to a second viewing zone, said first imaging units and second imaging units being separated by a plurality of third imaging units, and an illumination arrangement configured to illuminate the display panel with a plurality of light lines, the display being arranged such that said third imaging units are not used to display information when said first and second views are displayed.

In this manner, the imaging units effectively act as a barrier for directing light towards the viewing zones.

The third imaging units may be switched off when said first and second views are displayed.

The first, second and third pluralities of imaging units may be arranged in columns to form part of a two dimensional array of imaging units. The plurality of first imaging units may comprise imaging units arranged in adjacent columns of the array. Similarly, the plurality of second imaging units comprises imaging units may be arranged in adjacent columns of the display panel. The first, second and third pluralities of imaging units may be arranged in a periodic sequence of columns in said array.

The display panel may comprise a plurality of filters arranged in a layout that departs from a conventional periodic sequence of columns of filters corresponding to three primary colours. For example, the filters may be arranged in a two-dimensional array and/or may be based on four or more primary colours.

The illumination arrangement may comprise a light source and a barrier including a plurality of light transmissive portions arranged at a given pitch, located between the light source and the display panel, so that the display panel is illuminated by a plurality of light lines. The multi-view display may comprise a barrier including a plurality of light transmissive portions, to selectively admit light, said light transmissive portions being arranged at a first pitch and the barrier being positioned so that light emerging from the imaging units is incident thereon.

Where a barrier is provided, it may be in the form of a switchable device, such as a liquid crystal cell, that can be switched between a selectively transmissive mode, in which the barrier selectively admits light, and a light transmissive mode, in which the barrier is substantially light transmissive in order to provide uniform illumination for the display panel. This allows the display to be operated in both multi-view and single-view modes. Alternatively, or additionally, the barrier may be a switchable device, such as a liquid crystal cell, that can be operated in a first mode, in which the light transmissive portions are arranged with the first pitch, and a second mode, in which the light transmissive portions are arranged with a second pitch.

The display panel may comprise a plurality of colour filters. The colour filters and the barrier may be arranged so that they are out of alignment with each other. In other words, the barrier may be slanted with respect to the colour filters. Such an arrangement may be used to overcome an incompatibility between the arrangement of the first and/or second imaging units and the arrangement of the colour filters.

The illumination arrangement may comprise a light source arranged to generate light lines and a lenticular screen arranged to image the light lines within the display panel.

Light transmissive portions of the barrier and the third imaging units are aligned such that the light output by display panel creates the viewing zones in an asymmetrical arrangement.

The multi-view display may be arranged to display information in an automotive vehicle.

This aspect also provides a display system comprising the multi-view display and audio output means arranged to output audio signals corresponding to the information displayed in one or more of said viewing zones.

The invention will be described in detail by way of example embodiments, with reference to the following drawings, in which:

FIG. 17 depicts of a multi-view display according to a seventh embodiment of the invention;

FIGS. 18a and 18b show the scattering profile of a normal scatterer and a controlled scatterer used in the multi-view display of FIG. 16;

Figure 1:
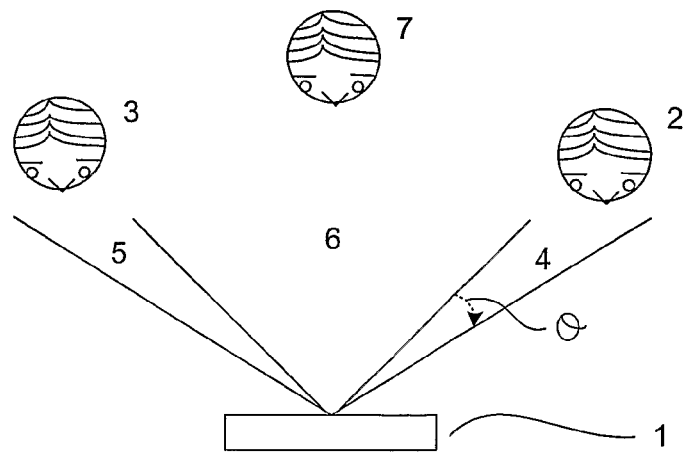
FIG. 1 depicts viewing zones and a cross-talk region created by a conventional multi-view display.
Figure 2:
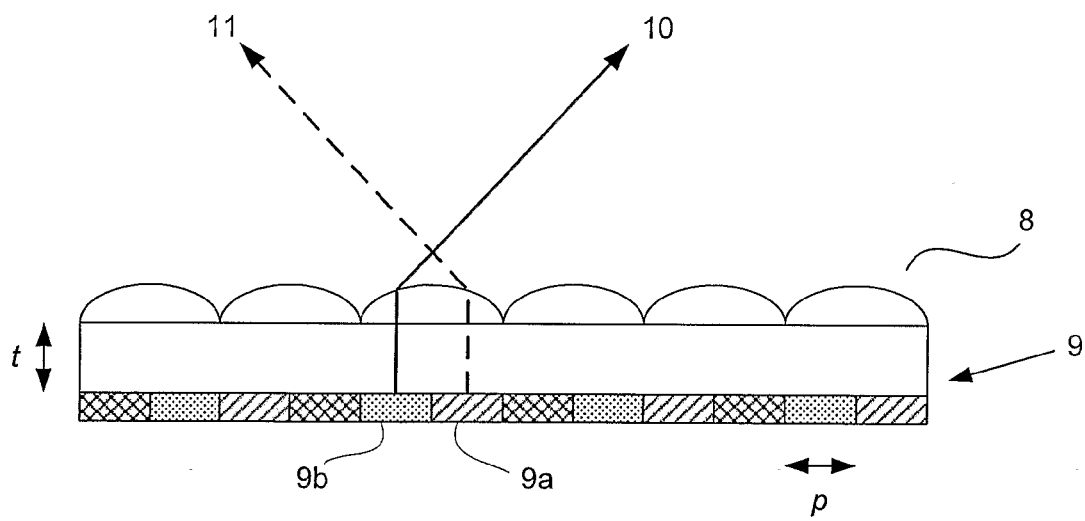
FIG. 2 depicts a known multi-view display comprising a lenticular screen.
Figure 3:
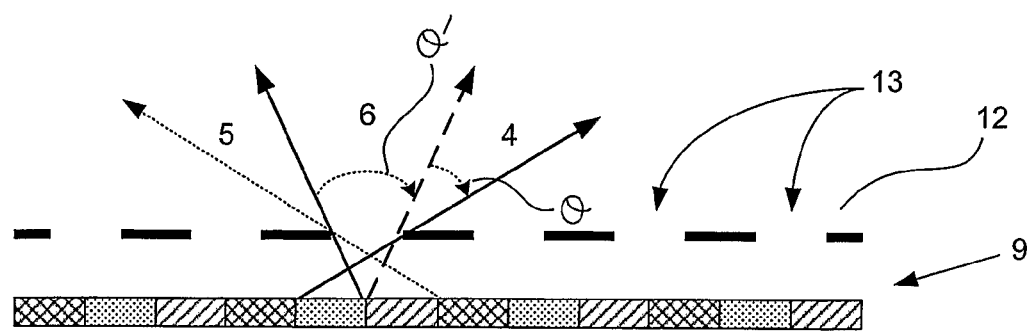
FIG. 3 depicts another known multi-view display, which comprises a front barrier.
Figure 4:
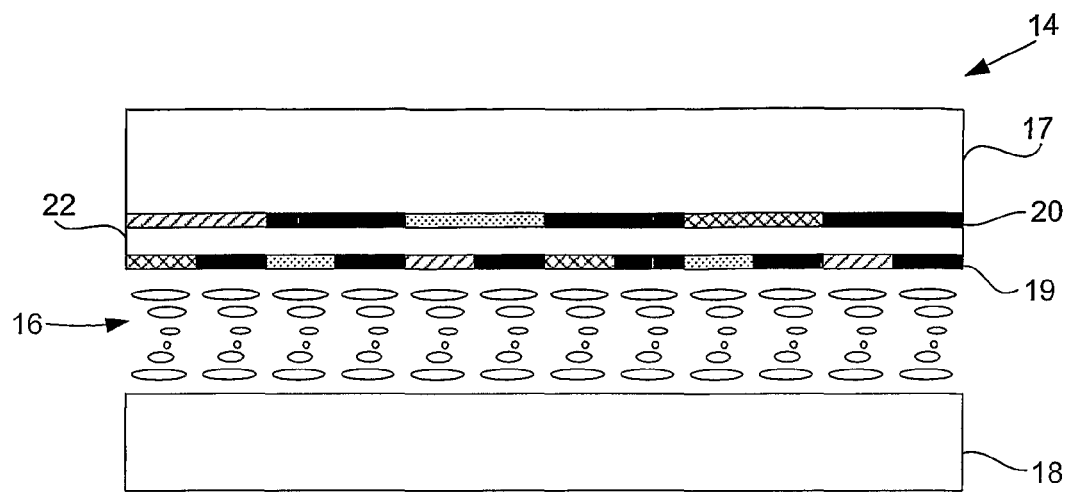
FIG. 4 depicts a multi-view display according to a first embodiment of the invention.

Referring to FIG. 4, a multi-view display according to a first embodiment of the invention comprises a display panel 14 and a backlight 15.

In this example, the display panel 14 comprises a layer 16 of electro-optically active material, such as a liquid crystal material, sandwiched between two light-transmissive substrates 17, 18. The substrates 17, 18 may be formed from glass or another suitable light transmissive material such as a plastic or quartz. Where liquid crystal material is used, the operation of the layer 16 may be based on any one of a twisted nematic (TN), super-twisted nematic (STN), vertically aligned nematic (VAN), optically compensated birefringence (OCB), in-plane switching nematics (IPS) or ferro-electric effect for modulating a polarisation direction of incident light.

The display panel 14 is divided into an array of subpixels and is provided with an active matrix or a passive matrix arrangement (not shown) for driving the array in order to allow an image to be displayed, in a manner well known per se.

A filter layer 19 is provided, comprising a series of columns of red, green and blue filters extending across the display in a vertical direction. The filters determine the colour of the subpixels when seen by a viewer. Each filter in the filter layer 19 is separated its adjacent filters by a black matrix. In FIG. 4, and in subsequent figures, red, green and blue filters are indicated using lines, shading and hatching respectively, while the black matrix is shown using solid shading.

In front of the filter layer 19, there is provided a barrier 20. The barrier 20 is located on the substrate 17 and is separated from the filter layer 19 by a sheet 21 of glass or other suitable light transmissive material.

Figure 5:
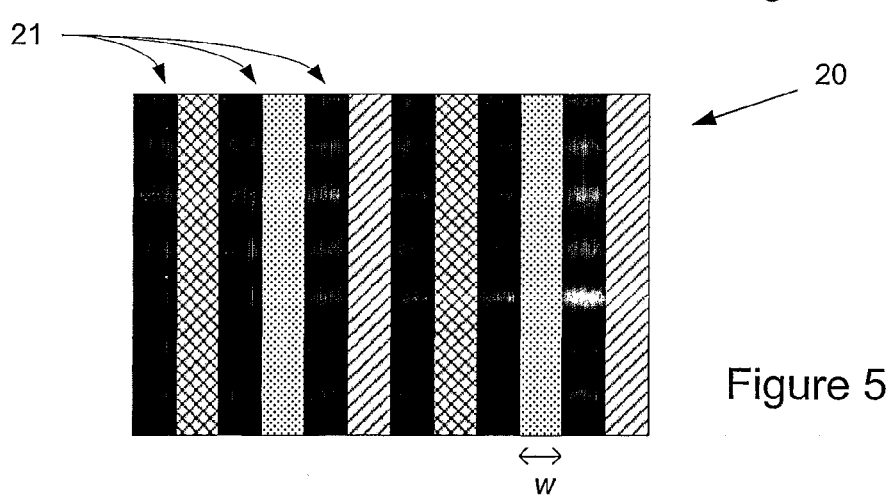
FIG. 5 is a plan view of a barrier of the multi-view display of FIG. 4.

The barrier 20, which is shown in plan view in FIG. 5, comprises a series of columns of red, blue and green colour filters separated by a black matrix 22. The colour filters are arranged in an order that is the reverse of a sequence used in the filter layer 19. In the arrangement of FIG. 4, the filter layer 19 is arranged as a periodic sequence of red, green and blue filters, while the barrier 20 comprises a sequence of columns of blue, green and red filters. The use of a reversed sequence in the barrier 20 is required in order to ensure that light of different colours emerge from the display panel at the same angle. If the filter layer 19 and barrier 20 used the same sequence of colour filters, the light from the red, green and blue subpixels would follow different directions, and would create their own respective viewing zones.

In this particular embodiment, in order to avoid generating cross-talk, the width w of each column of the barrier 20 is equal to 2p, that is, twice the pitch of the subpixels. If required, the columns may be configured with a smaller width w, or a slightly larger width w, as will be described in relation to other embodiments of the invention.

In this particular example, the filter layer 19 and barrier 20 are arranged so that the filter in each column does not match the colour of the subpixels that it overlies. However, it is not essential for the filter layer 19 and barrier 20 to be arranged in this manner. In other arrangements according to the invention, a number of overlying portions of the filter layer 18 and barrier 20 may match in colour.

The barrier 20 may be manufactured using photolithography to form columns of photopolymer material, in which a pigment of the relevant colour is dispersed. The red, green and blue columns may be, not is not necessarily, formed of the same colour filter material as the corresponding filters in the filter layer 19.

Figure 6:
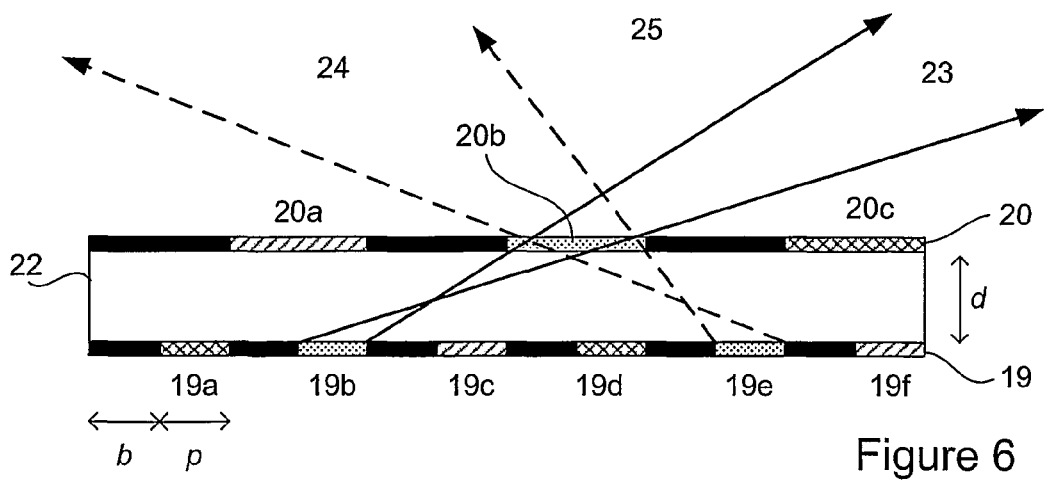
FIG. 6 is an enlarged view of part of the multi-view display of FIG. 4.

In order to avoid cross-talk, the red, green and blue filters used in the filter layer 19 and barrier 20 should be configured so that the translucent spectra of the various colour filters do not overlap. In this case, light emerging from the layer 16 of electro-optically active material can only pass through areas in the filter layer 19 and barrier 20 which match in colour. In other words, light cannot pass through a column of a given colour in the barrier 20 unless it has previously passed through a filter of the same colour in the filter layer 19. This limits the directions in which light emerges from the display as shown in FIG. 6, where light passing through green filters 19b, 19e in the filter layer 18 passes through a green column 20b of the barrier 20. However, the green column 20b will block light emerging from the red and blue filters 19a, 19c, 19d, 19f.

The selective transmission of light through the barrier 20 and, therefore, the avoidance of cross-talk, can be facilitated by using a backlight 15 that emits light of well determined wave-length. One way in which this can be achieved is by using a backlight comprising a plurality of light emitting diodes (LEDs). As the spectra of red, green and blue LEDs are well separated, the construction of one or more colour filters that transmit light produced by an LED of a particular colour and not the others is relatively straightforward.

Referring again to FIG. 6, light emerging from the green filter 19b passes through column 20b creates the right viewing zone 23. At the same time, light from another green filter 19e passes through the same column 20b and creates the left viewing zone 24, indicated using dashed lines. As the barrier 20 restricts the directions in which light emerging from subpixels 19b, 19e can propagate, an intervening region 25 located between the viewing zones 22, 23 is free from cross-talk.

The provision of a black matrix 22 results in the size of the intervening region 25 being increased and further reduces, or prevents, cross-talk.

Figure 7:
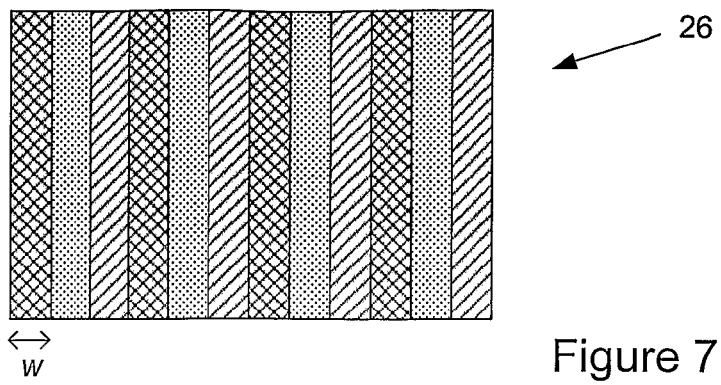
FIG. 7 is a plan view of a barrier used in a multi-view display according to a second embodiment of the invention.
Figure 8:
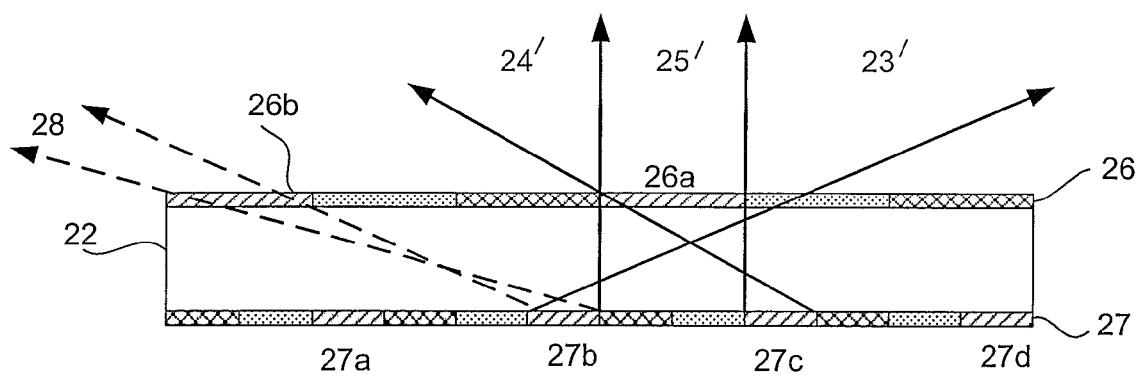
FIG. 8 is an enlarged view of part of a multi-view display according to the second embodiment of the invention.

FIG. 7 depicts a barrier 26 without a black matrix comprising a series of columns of red, green and blue filter material. It is noted that, in practice, there may be a black matrix separating the filters that has negligible effect on the performance of the barrier 26. FIG. 8 depicts the viewing zones 23', 24' and an intervening region 25' produced by a display comprising the barrier 26 and a filter layer 27 where, like the barrier 26, the filter layer 27 does not comprise a black matrix of significant width. The size of the intervening region 25' is limited by the dimensions of the column 26a in the barrier 26. In this particular example, the barrier 26 is configured with columns 26a with a width w that is equal to, or less than, twice the pitch p of the subpixels. For a typical subpixel size of 99 μm, the column pitch would be, at most, 198 μm.

The formation of an additional viewing zone 28 is also shown in FIG. 8. In this figure, light passing through red filters 27b and 27c are shown proceeding through a red column 26a of the barrier 26 to form left and right viewing zones 23', 24' as previously described. However, light from the red subpixels may also pass through other red columns of the barrier 26 to create further viewing zones. An example of this is shown where light emerging from red filter 27b also passes through red column 26b, as indicated using dashed lines, to form the additional viewing zone 28. Although not shown, a portion of the light passing through the red filter 27c will also pass through red column 26b, to form another viewing zone while light emerging from red filters 27a and 27d will pass through the red columns 26a, 26b and so on. In this manner, a number of additional viewing zones may be created through a single column 26a, 26b of the barrier 26.

While the formation of additional viewing zones 28 has been discussed in relation to the second embodiment, such side views may also be created by the display of FIG. 4.

For the display of the first embodiment, the angles $\tilde{\alpha}, \tilde{\beta}$ at which the main viewing zones 23, 24 begin and end, when measured within the substrate 17 with respect to normal, can be calculated as follows:

$$\tilde{\alpha} = \arctan\left(\frac{6jp2p - \frac{b}{2} + \frac{w}{2}}{d}\right) \quad (1)$$

$$\tilde{\beta} = \arctan\left(\frac{6jp + \frac{b}{2} - \frac{w}{2}}{d}\right)$$

where w represents the width of a single column 20a to 20c, b is the width of the black matrix of the filter layer 19, p is the pitch of the sub-pixels 19a to 19f, d is the separation between the filter layer 19 and barrier 20 which, in this case, is thickness of the sheet 22, and j denotes the number of the column.

Where the substrate 17 is made of a glass with a refractive index n of 1.5, the angles α, β at which the actual viewing zones 22, 23 begin and end, following refraction at the interface between the substrate 17 and air, are given by:

$$\alpha = \max(-1, \min(1, \arcsin(1.5 \sin(\tilde{\alpha})))) \quad (2)$$

$$\beta = \max(-1, \min(1, \arcsin(1.5 \sin(\tilde{\beta}))))$$

The min and max functions in the above equations are used to avoid complex angles due to total internal refraction.

The angles α, β are dependent on the transmission of the barrier 20 and filter layer 19 as follows:

$$\vartheta = (\beta - \alpha) = \frac{p-b}{p}\frac{w}{6p} \quad (3)$$

where the factor 6 is included since the transmission of each color filter is approximately ⅓ and the width w of the columns 20a to 20c is twice the pitch p of the subpixels 19a to 19f.

Figure 9:
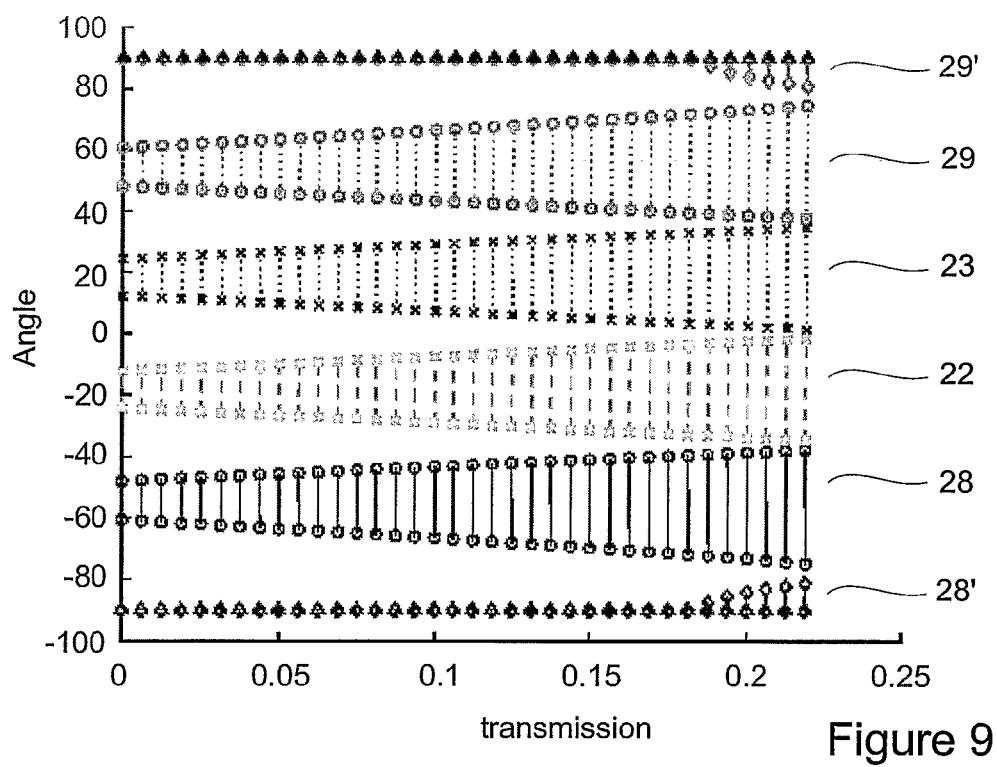
FIG. 9 is a graph showing the extent of the viewing zones as a function of the transmission of a barrier in the multi-view display of FIG. 4.

FIG. 9 depicts the relationship between the angles α, β and the transmission of the filter layer 19 and barrier 20 for an embodiment in which d=0.7 mm, p=0.1 mm and b=0.025 mm. In this example, two pairs of viewing zones 23 and 24, 28 and 29 are created, if the transmission is less than ≈0.18. The first and third viewing zones 23, 28 contain the same information. Similarly, identical information is presented in the second and fourth viewing zones 24, 29. The viewing zones 23, 24, 28, 29 do not overlap and, therefore, cross-talk is prevented.

Figure 10:
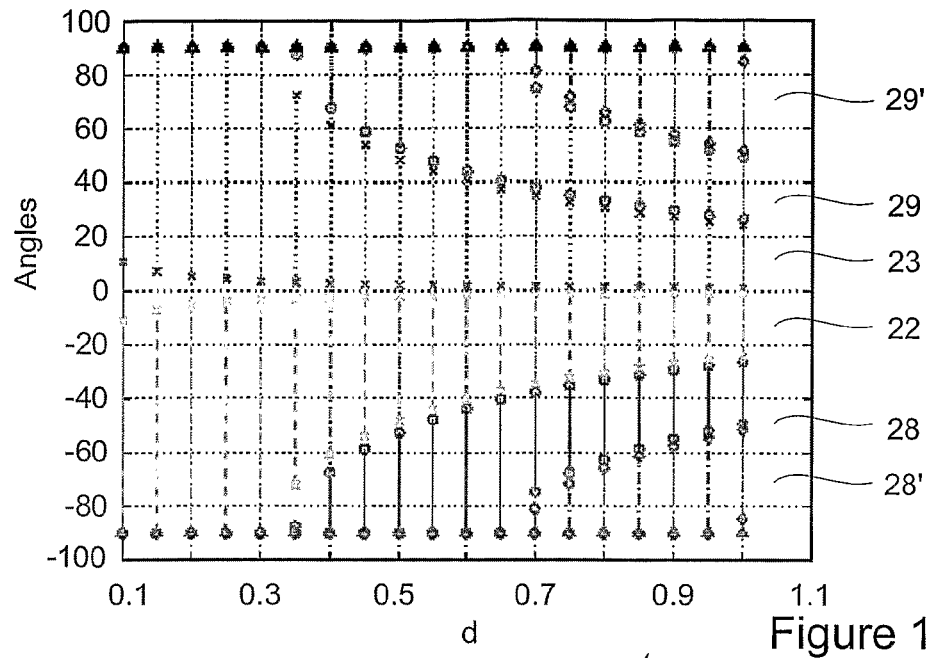
FIG. 10 is a graph showing the extent of the viewing zones as a function of the distance between the barrier and an imaging device for the multi-view display of FIG. 4.

The size of the viewing zones 23, 24, 28, 29 is dependent on the separation d between the filter layer 19 and barrier 20, so that a display in which the separation d is small will create relatively large viewing zones. FIG. 10 depicts the relationship between the angles α, β and the separation d, for arrangements in which the column width w is twice the subpixel pitch p and the remaining parameters are unchanged. Where the separation d is 1 mm, six viewing zones are created 23, 24, 28, 28', 29, 29', as indicated by the various symbols, each of which indicate the angle at which a respective viewing zone begins and ends, that is, angles α and β respectively. If the thickness d is within a range of, say, 0.35 to 0.7 mm, four viewing zones 23, 24, 28, 28', 29, 29' are created. If d is less than 0.35 mm, the display creates only two viewing zones 23, 24. Although this lowest range in separation results in a small number of viewing zones, such a configuration is potentially most useful for displays for use in automotive applications where only a limited number of viewing zones may be required.

If the subpixel pitch p is decreased by a given factor, in other words, if the resolution is increased, the sizes of the viewing zones 23, 24 may remain unchanged if the separation d, black matrix width b and column width w are scaled by the same factor. Therefore, if smaller subpixels are used, for example, subpixels with a pitch p of 42 μm, the sizes of the viewing zones 23, 24 can be maintained if there is a corresponding reduction in the thickness d of the sheet 22 to a value of:

$$d = \frac{0.042}{0.1} \times 0.35 \approx 0.150 \text{ mm} \quad (5)$$

Referring again to FIGS. 7 and 8, in an arrangement where the barrier 26 and filter layer 27 do not include a black matrix, or if the black matrix is of such dimension that it has only a negligible effect on the performance of the display, the opening angle θ of the viewing zones 23, 24 is:

$$\vartheta = a \sin\left(\frac{1}{n}\sin\left(a\tan\left(\frac{3p}{d}\right)\right)\right) \quad (6)$$

Therefore, the separation d required in order to obtain two viewing zones with opening angles θ of at least 20° is:

$$d < \frac{p}{0.0781}. \quad (7)$$

For an arrangement in which the pitch p of the subpixels is 42 μm, the separation d should be less than or equal to 0.538 mm.

As noted above, in known LCDs, the substrate 17 has a thickness of 0.7 mm or 1.1 mm. In order to obtain the desired viewing zones, the sheet 22 located between the layer 16 of electro-optically active material and the barrier 20 must be relatively thin. A suitable structure can be obtained as follows.

With reference to FIG. 4, a barrier 20 is created by depositing colour filter material and, if required, a black matrix, onto a substrate 17. Where the filter material is a photopolymer, this may be achieved using a photolithographic method to form columns of the colour filter materials. The substrate 17 may be a conventional substrate for use in an LCD, with a thickness of 0.7 mm or 1.1 mm. A thin sheet 22 of transparent material, such as glass, quartz or a light transmissive plastic, is then placed on top of the barrier 20. In this example, the sheet 22 has a thickness of approximately 150 μm. The filter layer 19 is then formed on top of the sheet 22. The filter layer 19 may be formed using a similar photolithographic method to that used for the barrier 20. The filter layer 19 may, if required, comprise a black matrix.

Figure 11:
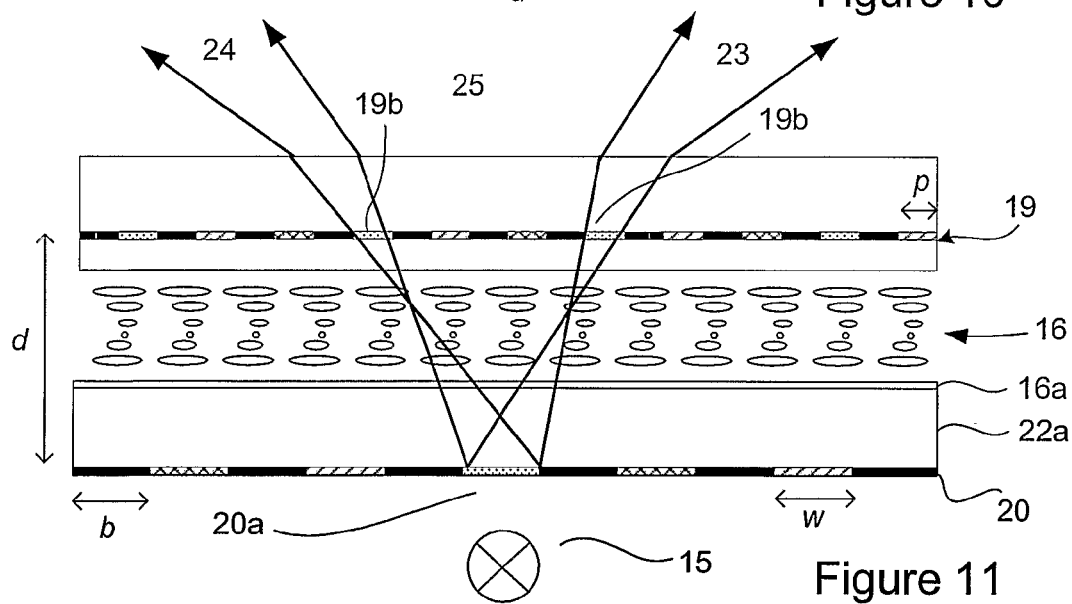
FIG. 11 depicts part of a multi-view display according to a third embodiment of the invention.

FIG. 11 depicts a third embodiment of the invention. Instead of being positioned in front of the filter layer 18, as in the first and second embodiments, the barrier 20 is positioned between the backlight 15 and the layer 16 of electro-optically active material. Such a barrier 20 is created by depositing colour filter material and, if required, a black matrix, onto a substrate 18 in a similar manner to that described above. The substrate 18 may be a conventional substrate for use in an LCD. A thin sheet 22a of transparent material is placed on top of the barrier 20. Means for operating the layer 16 of electro-optically active material, such as arrays of electrodes and TFTs, shown generally at 16a, are then provided on the sheet 22a.

Due to the presence of the barrier 20, light incident on the layer 16 of electro-optically active material can only pass through the subpixels in certain, predetermined, directions. FIG. 11 depicts the passage of light through one column 20a and two filters 18a, 18e, where the column 20a and filters 18b, 18e are of matching colour. As a result, two views 23, 24 are created, with an intervening region 25 in which there is no cross-talk.

In this particular embodiment, it is advantageous for the columns of the barrier 20 to be cholesteric filters. As cholesteric filters have light reflecting properties, this can result in improved light efficiency for the display, since the light blocked by each column 20a can be reflected into the backlight 15 for re-use.

The relationships between the angles at which the viewing zones start and end, $\alpha$ and $\beta$ respectively, and the separation d between the barrier 20 and filter layer 19, width w of the columns 20a, subpixel pitch p and black matrix width b are as described above, in relation to the first and second embodiments.

Figure 12:
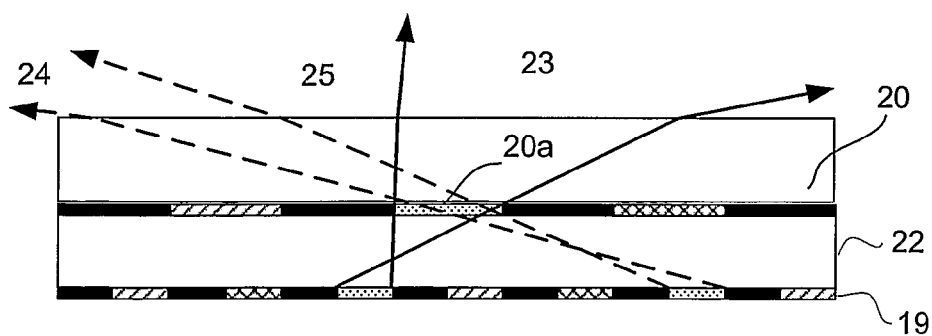
FIG. 12 depicts part of a multi-view display according to a fourth embodiment of the invention.

Each of the above embodiments produce a symmetrical arrangement of viewing zones 23, 24. However, in some applications, an asymmetrical arrangement of viewing zones 23, 24 may be desirable. For example, in an automotive application, it may be preferable for the display to be rotated towards a driver. This can be achieved by configuring a display with a suitable alignment of the columns 20a to 20c of the barrier 20 relative and the filters 19a to 19f of the filter layer 19 that match in colour. An asymmetrical arrangement may be based on any of the above embodiments. FIG. 12 depicts a filter layer 19 and barrier 20 for a multi-view display according to a fourth embodiment of the invention, which is arranged to provide such an assymetrical arrangement of viewing zones 23, 24.

Figure 13:
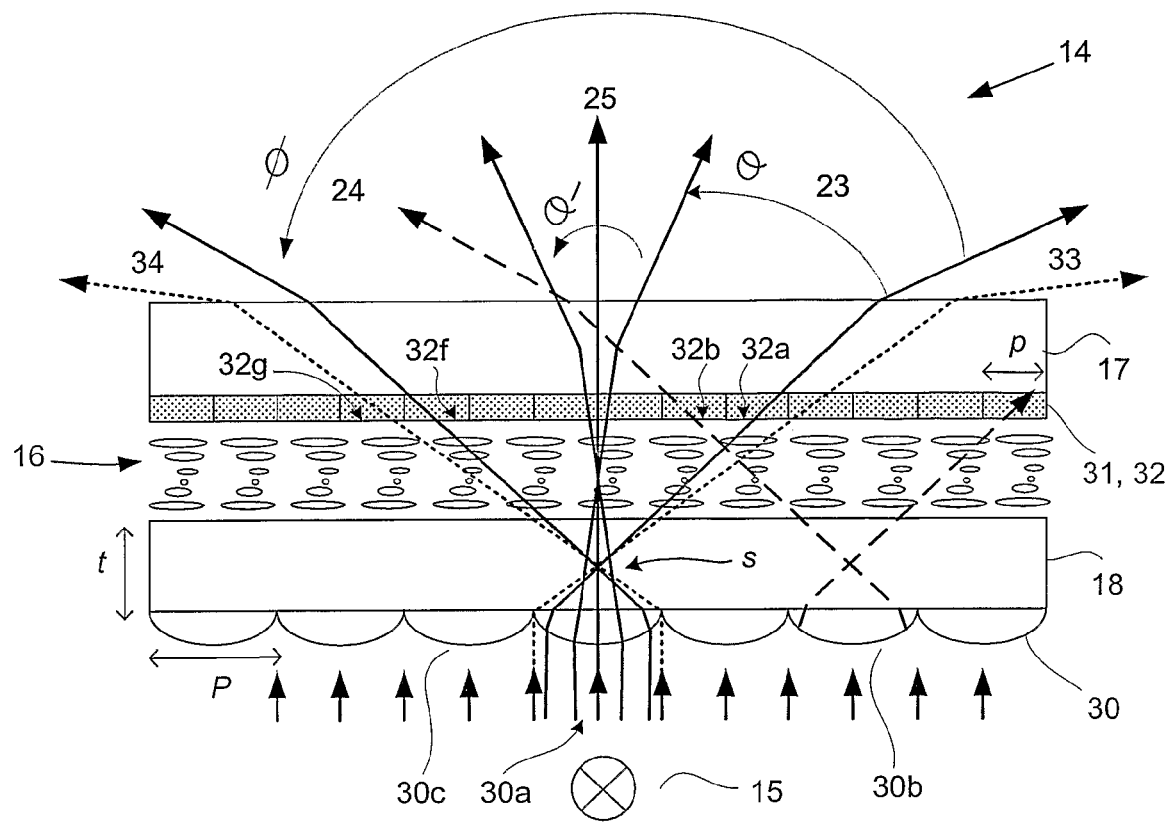
FIG. 13 depicts a multi-view display according to a fifth embodiment of the invention.

FIG. 13 shows a multi-view display according to a fifth embodiment of the invention, arranged to provide two views. The display comprises a backlight 15, a display panel 14 and a lenticular screen 30. The backlight 15 is arranged to output collimated light. However, in an alternative embodiment, the backlight may instead be arranged to emit light lines.

The lenticular screen 30 is positioned between the backlight 15 and display panel 14 and focuses the light from the backlight 15 so that the display panel 14 is illuminated by a plurality of light lines. The pitch P of the lenses of the lenticular screen 30 is twice the pitch p of the subpixels. In this particular embodiment, the pitch p of the subpixels is 0.15 mm and the pitch P of the lenses of the lenticular screen 30 is 0.3 mm. The thickness t of the substrate 18 that separates the lenticular screen 30 from the layer 16 of electro-optically active material is 0.7 mm.

Figure 14:
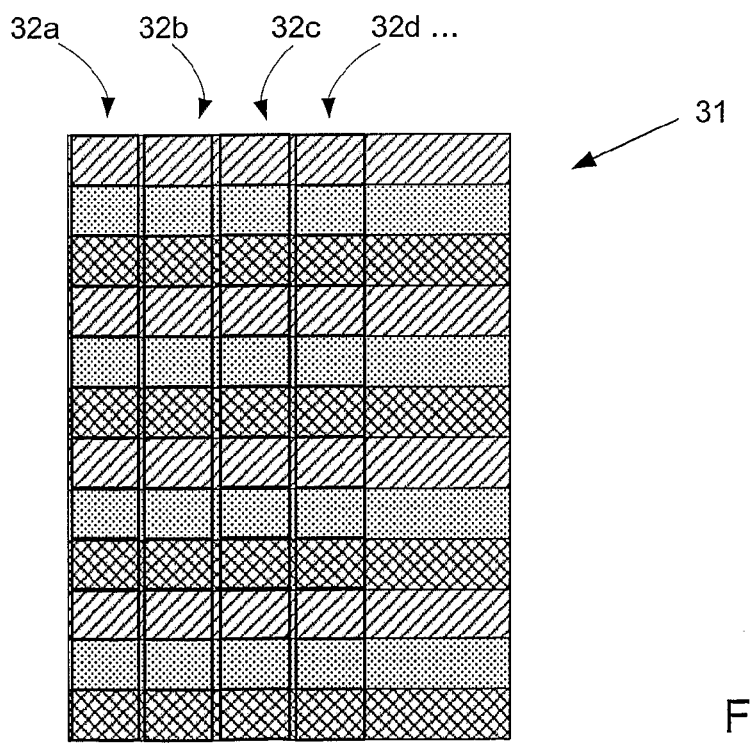
FIG. 14 depicts the filter layer of a display panel in the display of FIG. 13.

The filter layer 31 used in the display panel 14 is shown in plan view in FIG. 14. The positions of four columns of underlying columns of subpixels 32a to 32d are also indicated. The filter layer 31 is configured so that, when the display is in use, the filters are arranged as a series of horizontal rows. Alternative subpixel columns are used to present each view, so that subpixel columns 32a and 32c display information to the first viewing zone 23, while subpixel columns 32b and 32d display information for the second viewing zone 24.

FIG. 13 depicts light rays passing through one of the lenses 30a of the lenticular screen 30. The lens 30a images a light line onto the subpixels, so that a light ray passing through one subpixel column 32a is directed towards the first viewing zone 23 and light rays passing through another subpixel column 32f is directed towards the second viewing zone 24. The subpixel column 32b, which is adjacent to subpixel column 32a is illuminated by light imaged by lens 30b, as shown using dashed lines. The next subpixel column 32c, which is adjacent to 32b, is illuminated by light imaged by lens 30c. In this manner, adjacent subpixel columns 32a, 32b, 32c, 32f are illuminated by light that has passed through different lenses 30a, 30b, 30c of the lenticular screen 30. The light passing through subpixel column 32a and its adjacent subpixel column 32b propagate along different directions, according to the viewing zone 23, 24 in which the information displayed in the subpixel column 32a, 32b is to be viewed.

The multi-view display of FIG. 13 also creates a number of cross-talk regions 25, 33, 34. One cross-talk region 25, located between the viewing zones 23, 24, is caused by the finite spotsize s of the light passing through the display panel 14.

Cross-talk regions 33, 34 are formed at the outside edges of the viewing zones 23, 24 and are caused by stray light. In cross-talk region 34, which is adjacent to viewing zone 24, a viewer can perceive light is that has passed through subpixels 32 displaying information for the other viewing zone 23. This is indicated by the dotted line in FIG. 13, which shows light from lens 30a passing through subpixels 32g that are adjacent to the subpixels 32f. The stray light is directed towards the second viewing zone 24. The subpixels 32g display information intended for the first viewing zone 23. Therefore, the stray light will result in the display of information for the first viewing zone 23 in the cross-talk region 34. Similarly, in cross-talk region 33, the information visible in viewing zone 23 is visible, together with light that has through subpixels 32 displaying information intended for viewing zone 24, as indicated by the other dotted line in FIG. 13.

The size of the viewing zones 23, 24 depends on the opening angle of the light lines produced by the backlight 15 and lenticular screen 30, so that an arrangement in which light lines with a relatively small opening angle creates viewing zones 23, 24 of reduced size. Meanwhile, the sizes of the cross-talk regions 25, 33, 34 are determined by the width of the light lines. The maximum useable viewing angle $\phi$, which includes the viewing zones 23, 24 and cross-talk region 25, is determined by the thicknesses t of the substrates 17, 18 and the pitch p of the subpixels. In an arrangement where the thicknesses t of the substrates 17, 18 is 0.7 mm and that the pixels are oriented as shown in FIG. 13, the maximum usable viewing angle $\phi$ is 72°. If the width of the light line is 100 µm, the cross-talk region 25 has an opening angle $\theta'$ of 24° and the viewings zones 23, 24 each have opening angles $\theta$ of 24°. However, by selecting suitable dimensions for the light lines and lenticular screen 30, viewing zones 23, 24 with opening angles $\theta$ of 30° may be achieved.

While the viewing zones 23, 24 created by the display of FIG. 13 are relatively large when compared with prior art displays, significant cross-talk regions 25, 33, 34, are also created. In a multi-view display according to a sixth embodiment, shown in FIG. 15, cross-talk is avoided by preventing the information presented on the display from being visible in regions 25, 33, 34.

Figure 15:
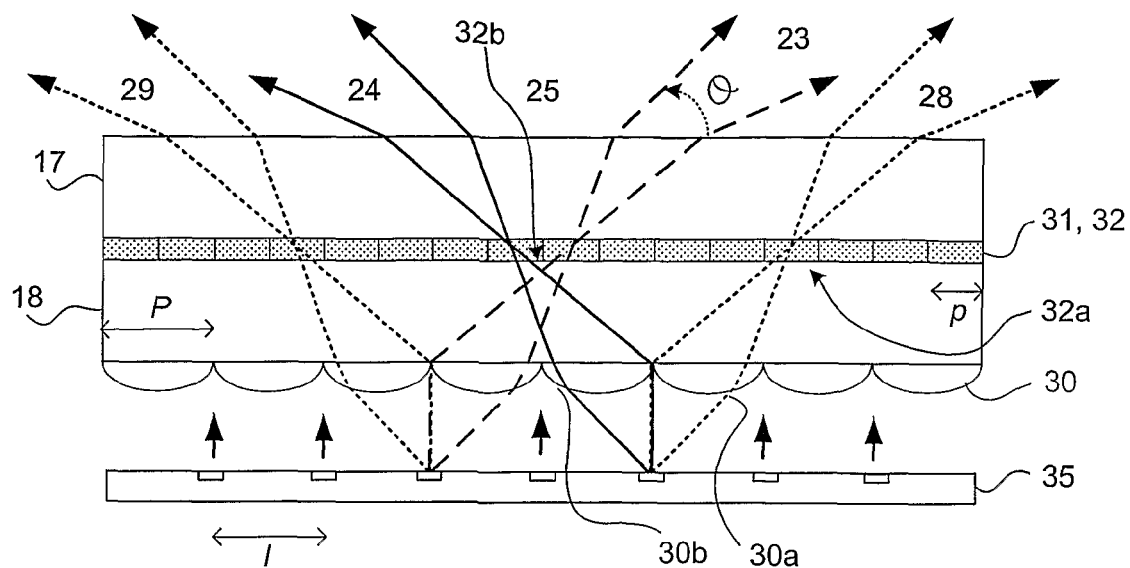
FIG. 15 shows a multi-view display according to a sixth embodiment of the invention.

In the display shown in FIG. 15, a backlight 35 is arranged to emit light lines, for example, using a plurality of suitably configured light sources and/or using a mask. The light lines have a pitch I that is approximately twice the pitch p of the subpixels. A lenticular screen 30 is positioned between the backlight 35 and the display panel 14. In order to simplify this figure, the layer 16 of electro-optically active material is not shown. In this figure, the positions of subpixels 32 are indicated by the positions of their corresponding filters in the filter layer 31.

Due to the alignment between the lenses 30a, 30b and light lines shown in FIG. 15, the problems caused by the finite spot size s of light imaged by the lenses in the arrangement of FIG. 13 do not arise. Therefore, no central cross-talk region 25 is produced.

The pitch P of the lenticular screen 30 is approximately equal to the pitch I of the light lines produced by the backlight 35. The lenses are positioned between the light lines and configured with an appropriate strength to focus the light lines onto the subpixels. The width of a light line when imaged onto a subpixel is preferably less than the pixel pitch p, in order to avoid unintentional illumination of adjacent subpixels and therefore avoiding the formation of cross-talk regions at the edges of the viewing zones 23, 24.

Figure 16:
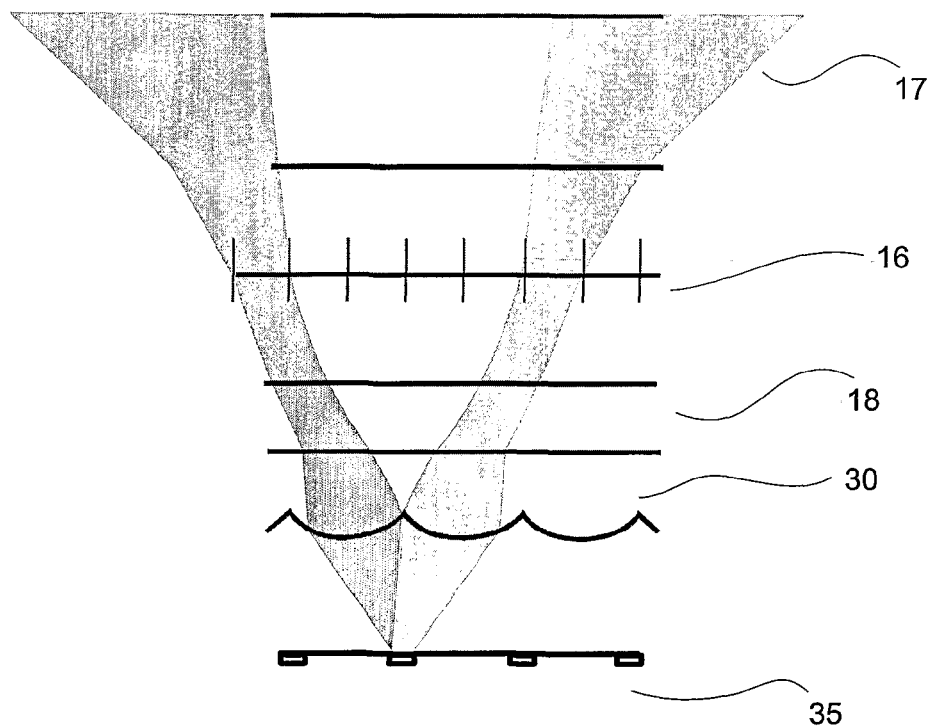
FIG. 16 depicts the path of light rays passing through the display of FIG. 15.
Figure 19A:
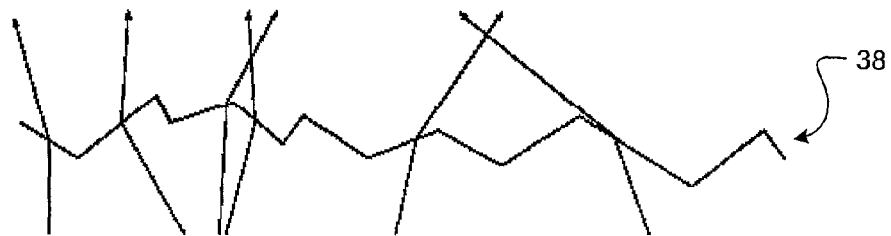
FIGS. 19a and 19b depicts surfaces of suitable controlled scatterers for use in the multi-view display of FIG. 16.
Figure 19B:
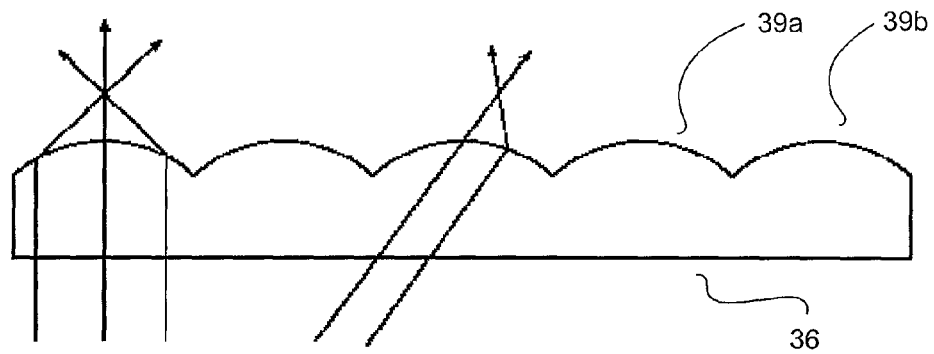

As in the display of FIG. 14, adjacent subpixels are illuminated by light imaged by different lenses of the lenticular screen 30 that propagate in different directions corresponding to the viewing zone 23, 24 in which the respective subpixels display information.

Where the substrates 17, 18 have a glass thickness of 0.7 mm, the multi-view display creates viewing zones 23, 24 with a viewing angle θ of 30°. The viewing zones 23, 24 are separated by an intervening region 25 in which there is no cross-talk. The paths of light rays through the display of FIG. 15, in order to display information from two respective subpixels, are shown in FIG. 16. The shaded region on the left corresponds to light rays for displaying information in viewing zone 24 and the shaded region on the right corresponds to the equivalent light rays for viewing zone 23.

In the multi-view display of FIG. 15, each light line is focused onto a subpixel that is adjacent to the lens of the lenticular screen 30 that performs said focussing. For example, a light line focused by lens 30a is imaged on a subpixel 32a while a light line focused by lens 30b is imaged onto subpixel 15b. It is not essential for the subpixels 32a, 32b and lenses 30a, 30b to correspond to one another in this manner. Other configurations may be used in which each lens 30a, 30b focuses light lines onto subpixels that not adjacent to it. In such an arrangement, the size of the intervening region 25, in which no information is visible, will be increased when compared with that created by the multi-view display of FIG. 15.

Where the display panel 14 provides a large screen area, when compared with the distance between a viewer and the multi-view display, it may be necessary to apply a "view point correction" when configuring the display. If the pitch P of the lenticular screen 30 and the pitch I of the light lines is twice the pitch p of the subpixels, a viewer may not be able to see the whole of a displayed image from a single position. A view point correction can be applied by using a lenticular screen 30 and light lines with pitches P, I that are greater than twice the pitch p of the subpixels. The required adjustment to the pitches P, I of the lenticular screen and light lines would be less than 1%, that is, less than 0.02p. For example, a correction of approximately 0.002p may be sufficient. Such a configuration allows the viewer to observe the whole display. The principle of the view point correction can also be used to create viewing zones 23, 24 of a desired size by selecting appropriate pitches I, P for the light lines and lenticular screen 30.

Another technique for further improving the size of the viewing zones will now be described with reference to FIG. 17, which shows a dual view display according to a seventh embodiment of the invention. As in FIG. 15, the layer 16 of electro-optically active material is not shown.

In the dual-view display of FIG. 15, an intervening region 25 is created between the first and second viewing zones 23, 24, in which no information can be viewed. The first and second viewing zones 23, 24 can be enlarged using a dedicated scatterer 36, placed in front of the display panel 14 as shown in FIG. 17. This allows the presentation of viewable information in the intervening region 25. This feature may be used instead of, or in addition to, optimizing the pitches I, P of the light lines and lenticular screen 30 in order to create viewing zones 23, 24 of a desired size.

In order to avoid cross-talk, the scatterer 36 should scatter incoming light over a limited range of angles that is less than, or equal to, the opening angle θ' of the intervening region 25. In other words, the scattering profile should be relatively narrow. FIG. 18a depicts a normal scattering profile. In a normal scatterer, a significant portion of the light is scattered over a wide angle, as shown by the "shoulders" 37 of the profile. By way of contrast, the scatterer 36 has a scattering profile as shown in FIG. 17b, where light is scattered over a relatively limited range of angles.

The scatterer 36 may be formed of a rough surface comprising a number of facets configured to provide a limited range of scattering angles. An example of a suitable structured scattering surface 38 is shown in FIG. 18a. FIG. 18b depicts an example of an alternative scattering surface 39, which is structured. It is not essential for a structured scattering surface to comprise sphere-like elements 39a, 39b and so on, as shown, however, whatever structures are provided should be of a small size compared to the pitch p of the subpixels, for example, with sizes of 10 to 50 µm.

Figure 20:
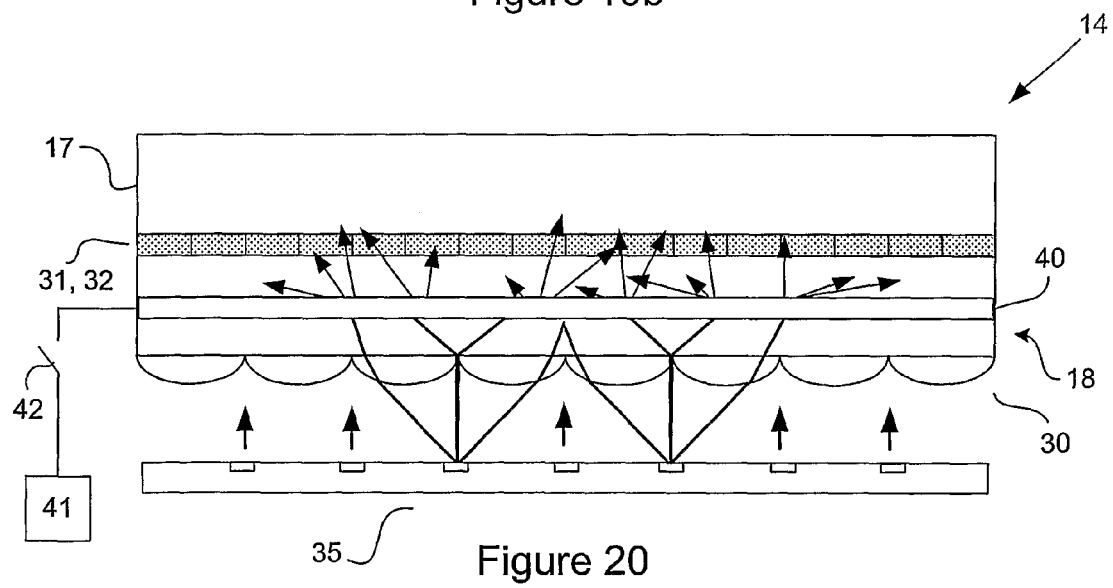
FIG. 20 depicts a multi-view display according to an eighth embodiment of the invention.

In an eighth embodiment of the invention, shown in FIG. 20, a multi-view display is configured so that it can be switched between a dual-view mode and a single view mode. When operated in a dual-view mode, up to half of the subpixels can be seen by each viewer. In single view mode, all subpixels are visible to all viewers, in other words, the same information is presented to each viewer.

In the display of FIG. 20, a diffuser 40 is located between the lenticular screen 30 and the layer 16 of electro-optically active material, not shown. The diffuser 40 is formed using a material whose light transmission properties vary with the application of an electric field thereto. For example, the diffuser 40 may be formed using a polymer dispersed liquid crystal (PDLC), which is transparent when an electric field is applied but diffusive in the absence of an electric field. Another suitable material for the diffuser 40 is a liquid crystal gel, which is normally transparent but becomes diffusive when a voltage is applied.

The diffuser 40 can be switched between at least two states by applying an electric field. The electric field is provided by a voltage source 41 and controlled using a switch 42. In its first state, the diffuser 40 is transparent so that the subpixels are illuminated by the light lines produced by the backlight 35. The display produces multiple views in the manner described above in relation to the sixth embodiment. When the diffuser 40 is switched into a second state, it diffuses the light lines produced by the backlight 36 so that the subpixels are uniformly illuminated. The display produces a single view so that a viewer can perceive information displayed by all subpixels, regardless of whether they are positioned in the first or second viewing zones 23, 24 or the intervening region 25.

As noted above, in relation to prior arrangements, the problems of cross-talk and viewing zones of limited size are due, in part, to the small pitch p of the subpixels relative to the separation d between a barrier and display panel. This separation d is often governed by the thickness t of a sheet of glass or similar material placed between the barrier and display panel. This problem is overcome in a ninth embodiment of the invention, as will now be described.

In conventional multi-view displays, adjacent columns of subpixels of a display panel present information directed to different viewing zones. For example, if the filter layer 31 and underlying subpixels 32 shown in FIG. 14 were used in a known dual-view display, the first column of subpixels 32a would display information for a first viewing zone while the second column of subpixels 32b would display information for a second viewing zone and so on. A number of embodiments will now be described, which depart from this convention.

Figure 21:
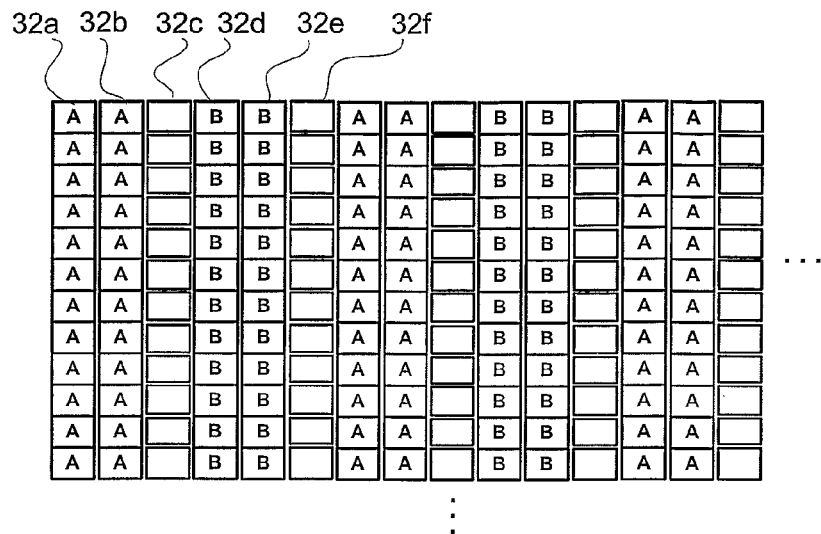
FIG. 21 depicts an array of subpixels for use in a multi-view display according to a ninth embodiment of the invention.
Figure 22:
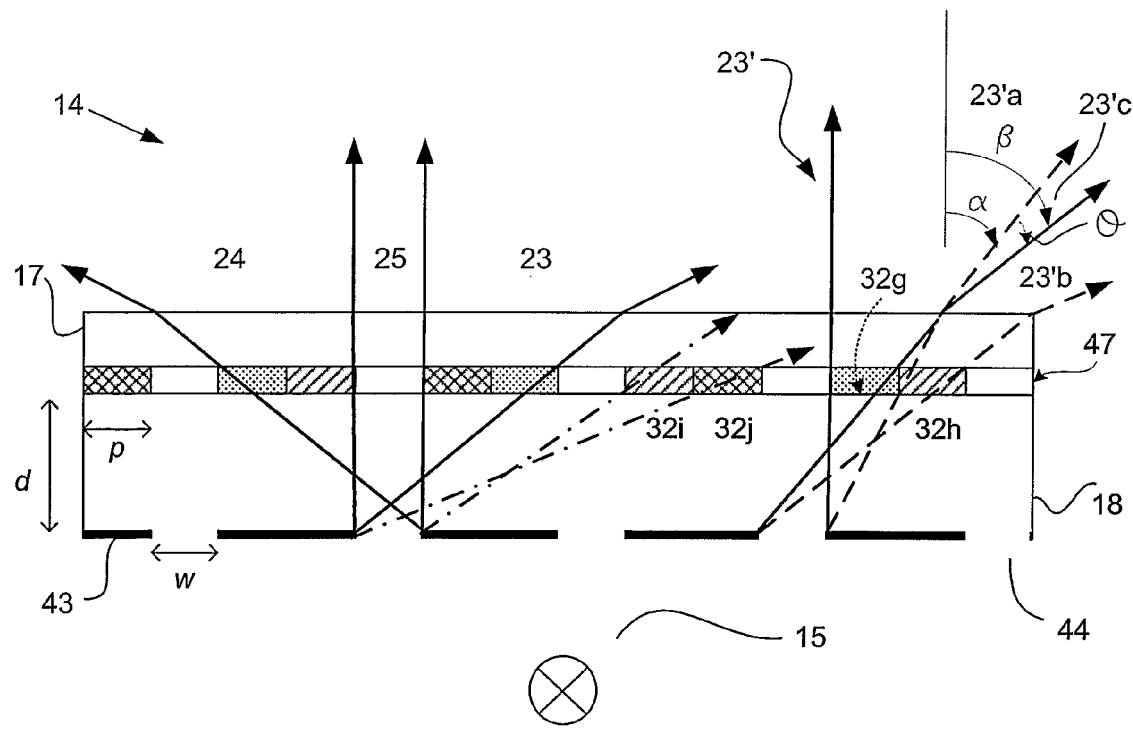
FIG. 22 depicts a multi-view display according to the ninth embodiment of the invention.

FIG. 21 depicts a portion of an array of subpixels, arranged in columns 32a to 32d and so on, for use in a multi-view display in accordance with a ninth embodiment of the invention, shown in FIG. 22.

In FIG. 21, the subpixels are marked 'A' or 'B' to indicate whether the subpixels are to present information to a first or second viewing zone 23, 24 respectively. The columns of 'A' subpixels 32a, 32b and 'B' subpixels 32d, 32e are separated by intervening columns of subpixels 32c, 32f, which remain switched off, or "dark", while information is displayed for the viewing zones 23, 24.

In this particular embodiment, adjacent columns of subpixels are used to present information to a given viewing zone. The subpixels in columns 32a and 32b are arranged to present information to the first viewing zone 23, while subpixels 32d and 32e are used to display information for the second viewing zone 23.

In the display of FIG. 22, a rear barrier 43 comprising slits 44 is positioned between the backlight 15 and display panel 14. The slits 44 are aligned with the intervening columns 32c, 32f of dark pixels and have a width w that is equal to the pitch p of the subpixels.

In this manner, the subpixel array acts as a second barrier, as light can pass through only the 'A' and 'B' subpixel columns 32a, 32b, 32d, 32e. The presence of the intervening columns 32c, 32f prevent cross-talk in the region 25 between the viewing zones 23, 24.

In this particular example, the width w of the slits 44 matches the pitch p of the subpixels 32. However, cross-talk can also be prevented in an alternative arrangement in which the slits 44 have a width w that is less than the pitch p of the subpixels. The opening angles of the viewing zones 23, 24 depend on the width w of the slits 43, as well as on the separation d between the barrier 42 and the subpixels 32 and the number of views associated with each slit 44. If, however, the barrier includes slits of a width w that is greater than the pitch p of the subpixels, the resulting viewing zones 23, 24 will overlap, producing cross-talk.

The structure of a viewing zone 23', in which information displayed by subpixel columns 32g and 32h is visible, is shown in FIG. 22 using dashed lines. Within the viewing zone 23', there are regions in which information from only one of the subpixel columns 32g, 32h is visible. These are labelled 23'a and 23'b respectively. Between these regions is an overlap zone 23'c, in which information displayed by both subpixel columns 32g, 32h can be viewed simultaneously.

For this particular example, where two adjacent subpixel columns 32a and 32b, 32d and 32e are used to present information for each viewing zone 23, 24 and the width w of the slits 44 is equal to the pitch p of the subpixels, the extent of the overlap zone 23'c can be calculated as follows. The angles at which the overlap zone 23'c begins and ends are denoted α and β respectively. However, before refraction at the interface between the substrate 18 and air, the start and end angles are given by:

$$\tilde{\alpha} = \arctan\left(\frac{p}{d}\right);$$

$$\tilde{\beta} = \arctan\left(\frac{2p}{d}\right)$$

Figure 23:
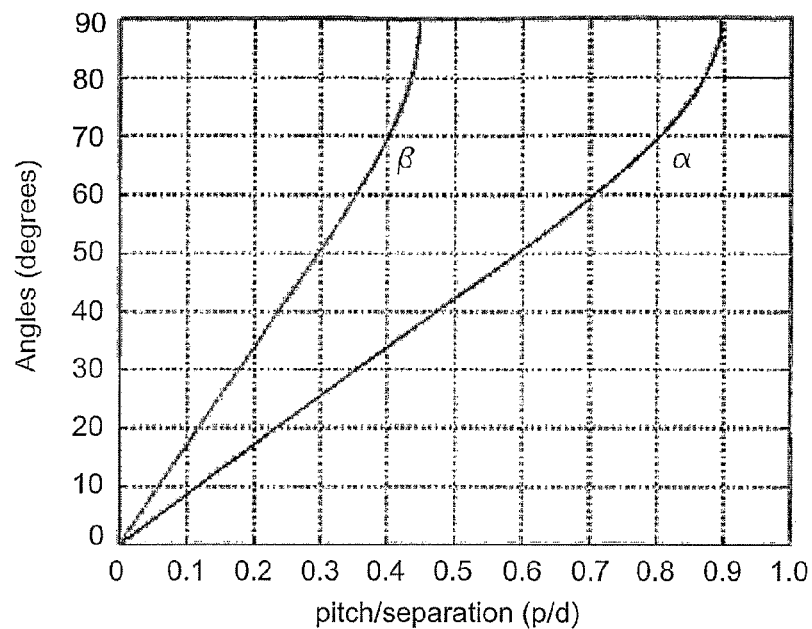
FIG. 23 is a graph showing the relationship between the angles at which an overlap zone begins and ends and the dimensions of the multi-view display of FIG. 22.

FIG. 23 is a graph showing the angles α and β as a function of p/d. For a display in which the pitch p of the subpixels is 0.099 mm and the separation d is 0.7 mm, α is equal to 12° and β is equal to 24°. Thus, the overlap zone 23'c has an opening angle θ of 12°.

Figure 24:
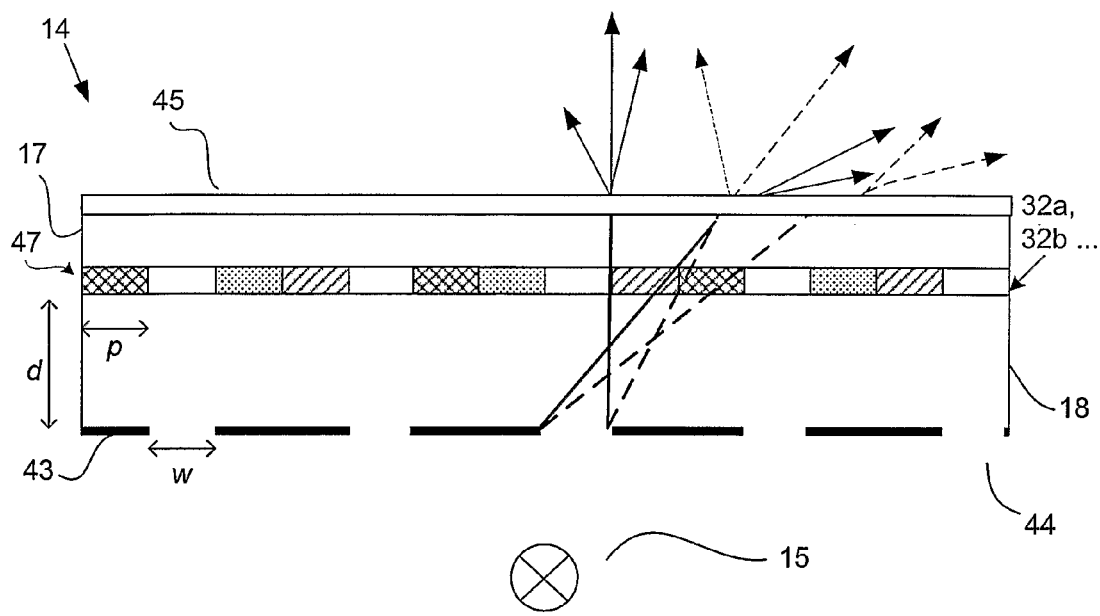
FIG. 24 depicts a multi-view display according to a tenth embodiment of the invention.

A number of optional measures may be employed to increase the opening angle of the overlap zone 23'c. For example, in a tenth embodiment of the invention, a diffuser 45 can be placed in front of the display panel 14, as shown in FIG. 24. If the diffuser 45 has an angular spread of, say, 10°, the improvement in the size of the overlap zone 23'c will be at the expense of the creation of a limited cross-talk region, some loss of resolution in the vertical direction and a reduction in the daylight contrast of the display panel 14. However, if a diffuser 45 that scatters only in the horizontal direction is provided, the loss of vertical resolution may be reduced or avoided altogether. Furthermore, a diffuser 45 that scatters light in specific directions only, such as Lumisty® foil produced by Madico, can be used. This type of diffuser is transparent for light with an incidence angle of ±15° with respect to normal, but scatters light with an incidence angle outside this range. The use of this type of diffuser 35 results in less cross-talk than a normal diffuser, as well as a smaller reduction in the daylight contrast of the display panel 14. In any case, the presence of any type of diffuser 45 will enlarge the overlap zone 23'c. In addition, the presence of a diffuser 45 will result in the subpixellation of displayed images, arising from the use of only one third of the subpixels of the array in providing a given view, to be less obvious to a viewer.

The sizes of the viewing zones 23, 24 and overlap zone 23'c can also be increased by reducing the separation d between the barrier 43 and the subpixels 32, for example, by decreasing the thickness of the substrate 18.

Figure 25:
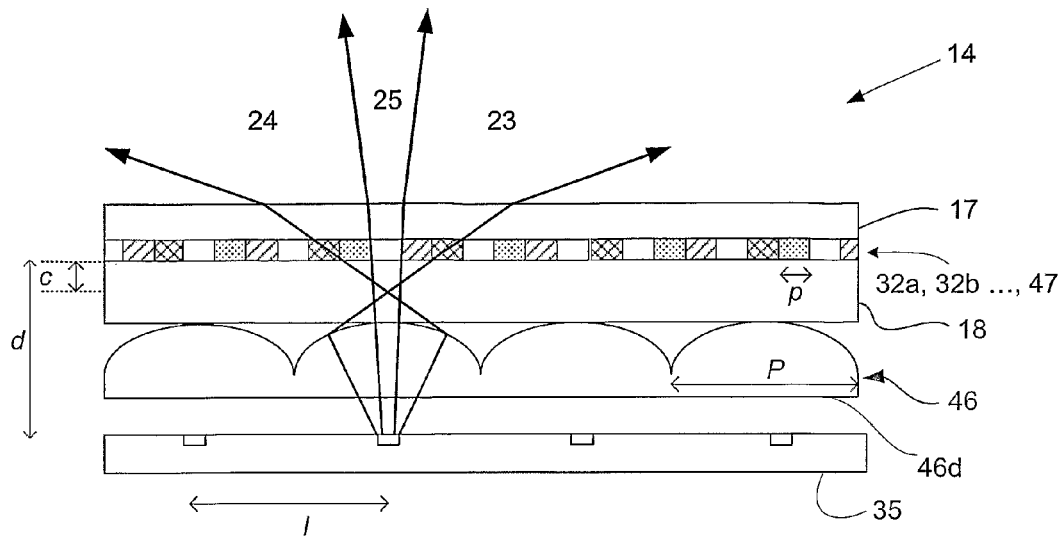
FIG. 25 depicts a multi-view display according to an eleventh embodiment of the invention.

A similar result can also be achieved by effectively producing light lines at a position that is closer to the layer of electro-optically active material, not shown. This concept is applied in a multi-view display according to an eleventh embodiment of the invention, shown in FIG. 25.

In this embodiment, a lenticular screen 46 is positioned between the backlight 35, which is arranged to generate light lines, and the subpixels 32. The lenticular screen 46 images the light lines at a distance c from the subpixels. The pitch P of the lenticular screen 46 is equal to the pitch I of the light lines produced by the backlight 35. The lenticular screen 46 is positioned so that its lenses are aligned with the light lines. In this example, the subpixels 32 are operated as shown in FIG. 21, so that the arrangement of 'A' subpixel columns 32a, 32b, 'B' subpixel columns 32d, 32e and dark subpixel columns 32c, 32e has a period of 6 subpixels. For this reason, the pitch of the lenticular screen 46 is six times the pitch p of the subpixels.

In this particular embodiment, the dark subpixel columns 32c, 32f are aligned with the light lines generated by the backlight 35, but it is not essential for the dark subpixel columns 32c, 32f and light lines to be aligned in this manner. If the multi-view display is arranged to eliminate cross-talk in the intervening region 25, the width of the light lines should be less than, or equal to, the pitch p of the subpixels.

Since the pitch P of the lenses is six times the pitch p of the subpixels, the maximum value of c is 5/11 of the thickness of the substrate 18. This effectively reduces the ratio of p/d by a factor of 5/11. For a subpixel pitch p of 0.099 mm, the effective p/d ratio is 0.064. Such an arrangement would provide an overlap zone 23'c in which α is 26° and β is 52°, in other words, having an opening angle θ of 26°. This compares favourably with the opening angle of 12° achieved by the multi-view display of FIG. 22.

Ideally, the opening angle of the light lines produced by the backlight 35 is such that the light from a given light line passes through the lens it is aligned with. For example, to meet this requirement, light from a light line produced at 35b will pass through lens 46b only and not through adjacent lenses 46a, 46c. Therefore, in order to provide a thin multi-view display, the opening angle of the light lines should be small. In practice, the opening angle may be larger than the pitch of a single lens 46a. This results in light from a light line at 35a passing through an adjacent lens 46b and producing further, unwanted, light lines.

Figure 26:
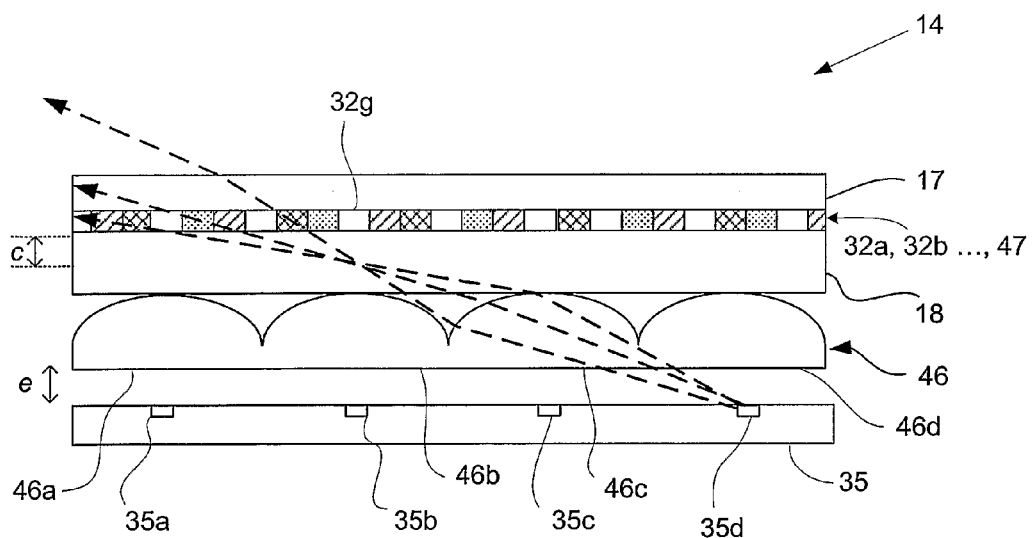
FIG. 26 depicts the imaging of stray light in the multi-view display of FIG. 25.

The problems caused by light lines with a large opening angle can be prevented by configuring the distance e between the backlight 35 and lenticular screen 46 such that the lenses 46a to 46d provide a magnification factor equal to a positive integer. An example of this imaging is depicted in FIG. 26, which depicts the multi-view display of FIG. 25, where the distance e between the backlight 35 and lenticular screen 46 is such that the multiplication factor of the lenses 46a to 46d is equal to one. This causes the light from a light line at 35d entering an adjacent lens 46c to be imaged at the same location as the light from light lines at 35b. In other words, the stray light is imaged at a distance c from the subpixels 32, at a position aligned with the lens 46b, the light lines from 32b and, in this particular embodiment, an overlying column of dark subpixels 32g.

When the array of subpixels is operated according to in FIG. 21, only one third of the subpixels are used to present a given view which, as noted above, can lead to subpixellation of displayed images being perceived by a viewer. Furthermore, this arrangement is not compatible with a conventional filter layout, in which the filters are arranged as a series of red, green and blue columns. This is because, within the overlap zone 23'c, only two of the three available primary colours can be viewed.

This problem can be overcome by using a specialized layout for the colour filter layer 47. For example, the filters in the filter layer 47 may be arranged as a plurality of horizontal rows, rather than vertical columns or as a two dimensional array of colour filters. In either arrangement, the light from different subpixels in a single column 32a may pass through different colour filters, so that the information visible in the overlap zone 23'c comprises all of the available primary colours. Another option would be to use a filter layer 47 with a different number of primary colours. For example, if the filter layer 47 is arranged as a series of columns of red, green, blue and yellow filters, there is no incompatibility between the filter layer and subpixel arrangement.

In embodiments comprising a barrier, such as that shown in FIG. 22, another possible solution would be to position the filter layer 47 at an angle to the barrier 43, although this may result in the generation of some cross-talk. For example, the filter layer 47 and barrier 43 may be arranged so that the angle between them has a tangent of ⅓, that is, is approximately 18.4°, by arranging one or both of the filter layer 47 and barrier 43 at an angle to the subpixel array.

The above discussion assumes that the light lines emerging from the slits 44 has an opening angle that is less than or equal to 6p, that is, within one period of the arrangement of subpixels shown in FIG. 21. In practice, the angular spread of the light may be larger, though this will result in the duplication of viewing zones 23, 24. For example, FIG. 22 depicts two light rays, shown using dot-dashed lines, passing through subpixels 32i, 32j. This will result in a further viewing zone, not shown, in which the information shown in viewing zone 23 is duplicated.

Figure 27:
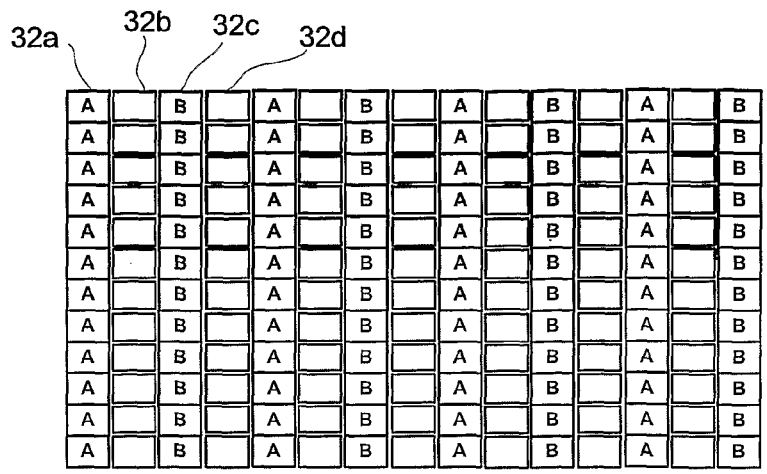
FIG. 27 depicts an array of subpixels for use in a multi-view display according to a twelfth embodiment of the invention.

FIG. 27 depicts an alternative arrangement of subpixels for use in a multi-view display according to a twelfth embodiment of the invention. In other words, column 32a is used to present information to the first viewing zone 23, while column 32c is used to display information for viewing in the second viewing zone 24. Columns 32b, 32d, which are located between the 'A' subpixels, such as column 32a, and 'B' subpixels, such as column 32c, remain switched off when the multi-view display is in use. While this arrangement has an effective pitch equal to the pitch p of the subpixels, the presence of the dark subpixels 32b, 32d act to suppress cross-talk.

Figure 28:
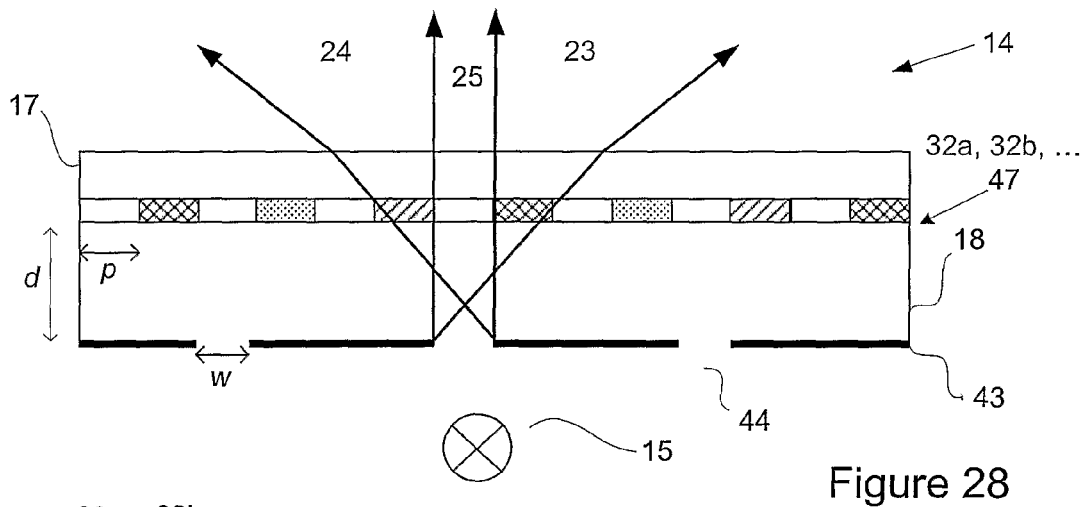
FIG. 28 depicts a multi-view display according to the twelfth embodiment of the invention.

FIG. 28 shows a multi-view display comprising a subpixel array operated according to FIG. 27. In this particular example, the slits 43 have a width w that is equal to the pitch p of the subpixels. The multi-view display creates two viewing zones 23, 24, with an intervening region 25 in which there is no cross-talk.

While the multi-view display of FIG. 28 reduces or prevents cross-talk, the resolution of the display panel 14 is reduced as only one out of every four subpixels 32 is used to provide a given view. In addition, the light efficiency of the multi-view display is reduced as alternate columns 32b, 32d of the subpixel array are switched off.

Figure 29:
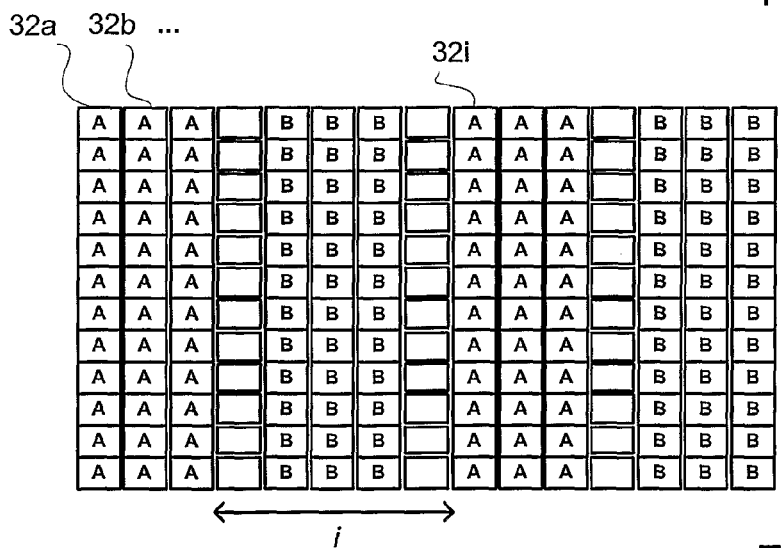
FIG. 29 depicts an array of subpixels for use in a multi-view display according to a thirteenth embodiment of the invention.

FIG. 29 depicts a subpixel array for use in a multi-view display according to an thirteenth embodiment of the invention. In this arrangement, three adjacent columns 32a, 32b, 32c of subpixels are used to present information to a first viewing zone and three columns 32e, 32f, 32g are used to display information to a second viewing zone. Intervening columns 32d, 32h are provided, which remain switched off while the multi-view display is in use. In such an embodiment, three out of every eight subpixels is used to display information to a given viewing zone. Therefore, this embodiment has a greater light efficiency compared with the ninth to twelfth embodiments and, in addition, permits the use of a conventional layout of red, green and blue colour filters. However, in this embodiment, and in further embodiments that use more than three adjacent columns of pixels to provide a given view, there is a relatively large interval i between the columns used to provide a particular view. In this particular example, this interval i extends between columns 32c and 32i. This increased interval i may result in visual artifacts.

In the ninth to thirteenth embodiments discussed above, the subpixels effectively act as a barrier, allowing light to pass through selected subpixels in order to prevent cross-talk and/or provide viewing zones 23, 24 of increased size. As the arrangements of FIGS. 21, 27 and 29 differ in terms of how the individual subpixel columns 32a to 32h are employed, that is, whether a given subpixel column 32a to 32h is to be switched on or off and, if switched on, which information is to be displayed. Therefore, a single multi-view display can be arranged to switch between operational modes according to two or more of these arrangements, or between one or more multi-view modes and a single view mode, by operating the array of subpixels accordingly, where corresponding modifications are made to the rear barrier 43.

In this respect, the rear barrier 43 may be replaced by a switchable barrier, such as a liquid crystal cell or other light shutter type device, to provide a display that can be switched between multi-view and single-view modes. A display comprising such a barrier, in the form of a liquid crystal cell 47. The liquid crystal cell 48 can be switched into a first state, in which it acts in a similar manner to the barrier 43. The pixels or subpixels of the cell 48 are operated to form light transmissive portions, shown using vertical lines, and dark portions, corresponding to the slits 44 and opaque portions of the barrier 43 in the ninth embodiment. In this state, the display creates multiple viewing zones 23, 24 as described above. When switched into a second state, the cell 48 becomes largely or completely transparent. The display may then be used to present a single view, in which all the subpixels 32 of the display panel 14 may be illuminated.

If required, the cell 48 and the filter layer 47 may be arranged at an angle to one another, as discussed above in relation to subpixel arrangements with a period of six columns.

Figure 30:
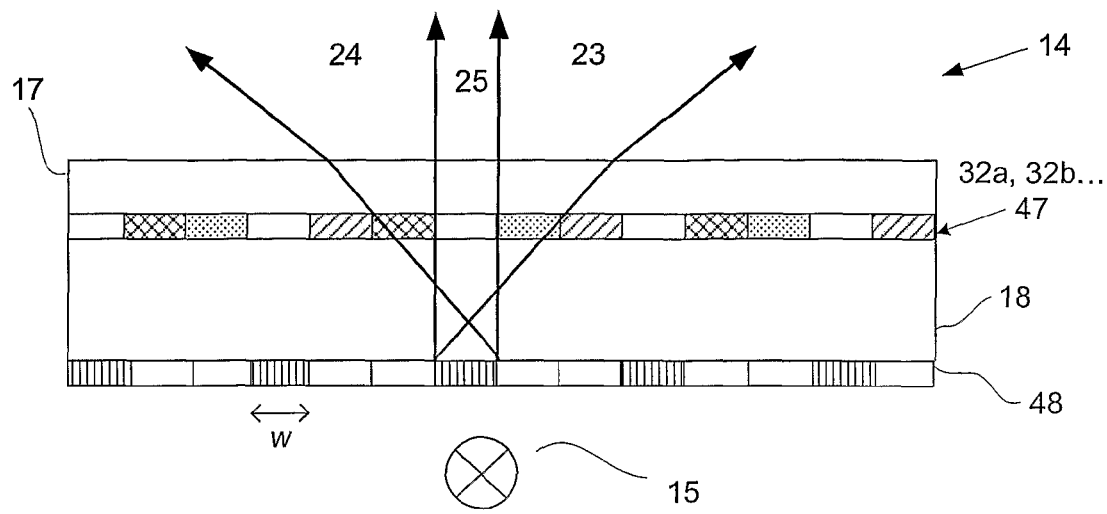
FIG. 30 depicts a multi-view display according to a fourteenth embodiment of the invention.

The display may be arranged so that the arrangement of light transmissive portions and dark portions created when the cell 48 is in its first state can be altered by operating the cell 48 accordingly. For example, the display of FIG. 30 uses the arrangement of subpixels 32 shown in FIG. 21, which has a period of six subpixels. The display can be reconfigured to use an arrangement with a period of eight subpixels by operating the subpixels 32 as shown in FIG. 29 and by operating the cell 48 to provide a barrier with an appropriate period. In this case, the cell 48 would be operated so that every fourth column of subpixels 32 is light transmissive.

Figure 31:
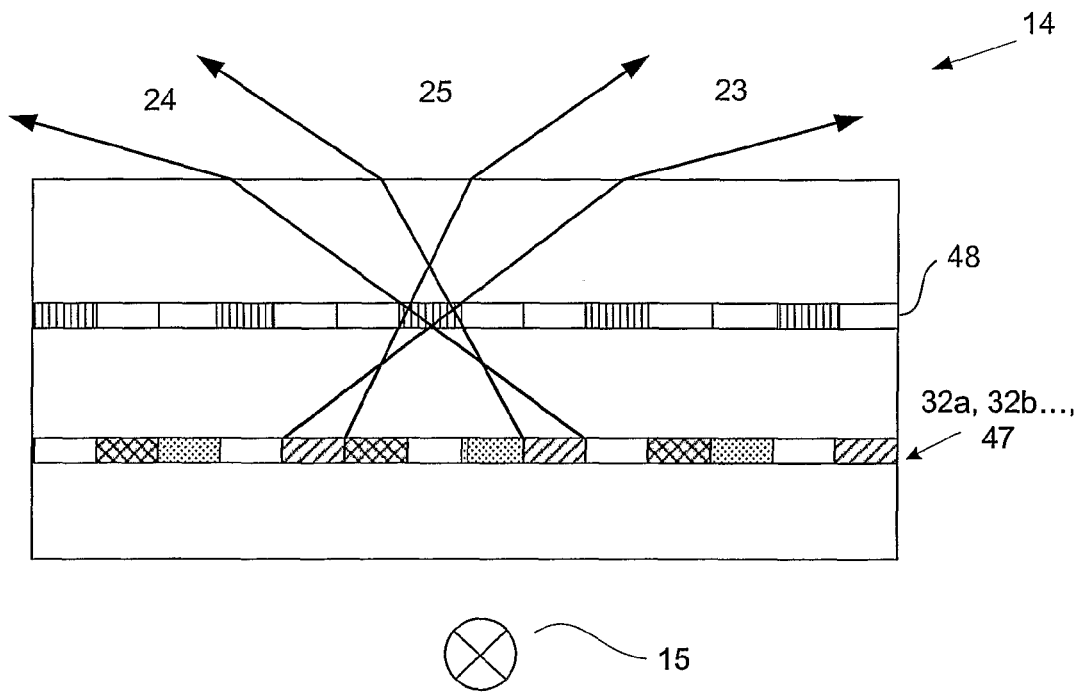
FIG. 31 depicts a multi-view display according to a fifteenth embodiment of the invention.

The ninth, tenth, twelfth and thirteenth embodiments described above each include barriers 43, 48 positioned between the backlight 15 and subpixels 32. However, the barriers 43, 48 in these arrangements may instead be placed in front of the subpixels 32. FIG. 31 shows an example of a display with a front barrier, according to a fourteenth embodiment of the invention. The display otherwise resembles that of the thirteenth embodiment, where the barrier is a liquid crystal cell 48 that can be switched between a first state, in which only portions of the cell 48 are light transmissive, for presentation of multiple views, and a second state in which the cell is mostly, or wholly, light transmissive, where the display is used to create a single view. As in the previous embodiments, if required, the barrier 48 and filter layer 47 may be arranged so that the light transmissive portions of the barrier 48 and the filters in the filter layer 47 are slanted with respect to one another, so that light from a light line passing through a given subpixel column 32a to 32g will then pass through two or more adjacent filters of the filter layer, producing a view based on more than one primary colour.

The opening angle of the viewing zones 23, 24 or overlap zone 23'c of the tenth and eleventh embodiments may be further improved by providing a diffuser and/or a lenticular screen, as discussed above in relation to the eleventh embodiment.

In the ninth to fourteenth embodiments, the subpixel array is operated according to an arrangement with a period of six, four and eight subpixels respectively, the principle of an arrangement in which selected columns of the subpixel array remain dark can be used to provide arrangements with other periods. Furthermore, it is not necessary for the same number of subpixel columns to be used for each view and the subpixel layouts of FIGS. 21, 27 and 29 can be departed from in order to provide an asymmetric display. For example, an arrangement in which one period includes three 'A' columns of subpixels, two 'B' columns of subpixels and two intervening columns could be used.

Figure 32:
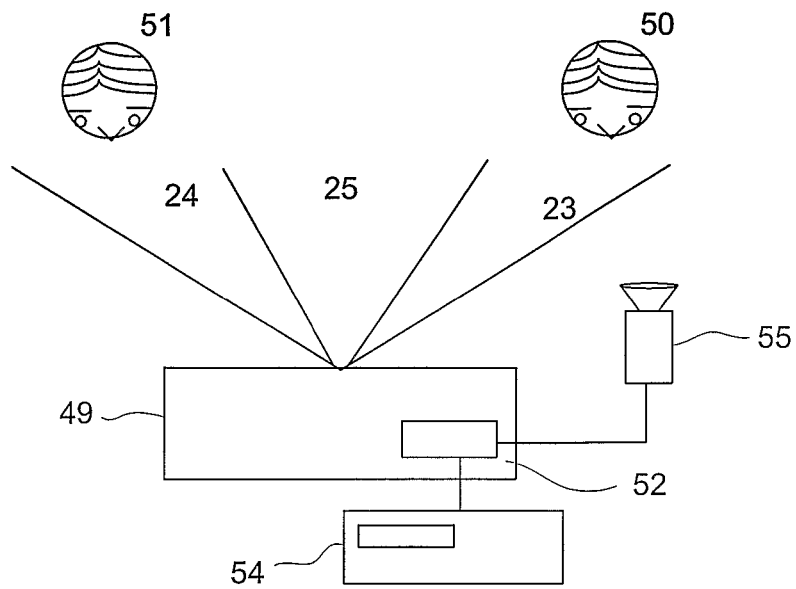
FIG. 32 shows a display system comprising a multi-view display according to any one of the first to fifteenth embodiments.

FIG. 32 depicts a display system according to the present invention. The display system comprises a multi-view display 49 according to any one of the first to third, fifth and subsequent embodiments, arranged to create two viewing zones 23, 24, in which is displayed information intended for viewers 50, 51. The display 49 includes, or is otherwise connected to, a controller 52, arranged to operate the display panel 14. For example, where the display panel 14 comprises a layer 16 of liquid crystal material controlled by an array of TFTs, the controller 52 will operate the TFTs according to the image data to be displayed. If the display 49 includes a switchable diffuser 36, the controller 52 may also control the voltage source 41 and switching means 42. Where the display 49 comprises a switchable barrier, such as the liquid crystal cell 47 described in relation to the fourteenth and fifteenth embodiments, the controller 52 may also control the cell 47, for example, using a dedicated array of TFTs, to provide a barrier with a desired configuration.

The image data is generated by or received by one or more data sources 54. For example, the display system may be mounted in an automotive vehicle 53, as shown in FIG. 5, and one data source 54 may be a processor arranged to generate and present route planning information in the viewing zone 23 associated with the driver 50. Alternatively, or additionally, image data may be obtained from a data source 54 such as a digital versatile disc (DVD) player, a video compact disc (VCD) player or a receiver arranged to receive video or audio-video signals via a terrestrial or satellite network, such as a television receiver or a receiver of video telephone calls. Another example of a suitable data source 54 is a terminal arranged to connect to a computer network such as the Internet.

If required, audio output means may be provided to present audio signals relating to the displayed information. The audio signals may be provided by the external source and/or the controller 52. For example, a loudspeaker 55 or an output configured to provide sound via one or more sets of headphones, not shown, may be provided.

Figure 33:
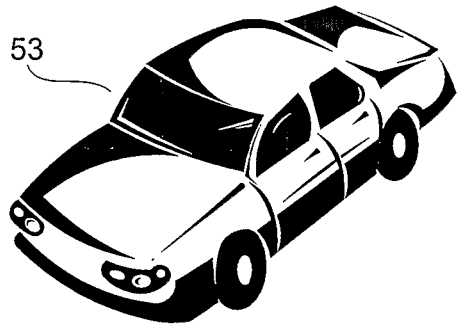
FIG. 33 depicts an automotive vehicle equipped with the display system of FIG. 32.
Figure 34:
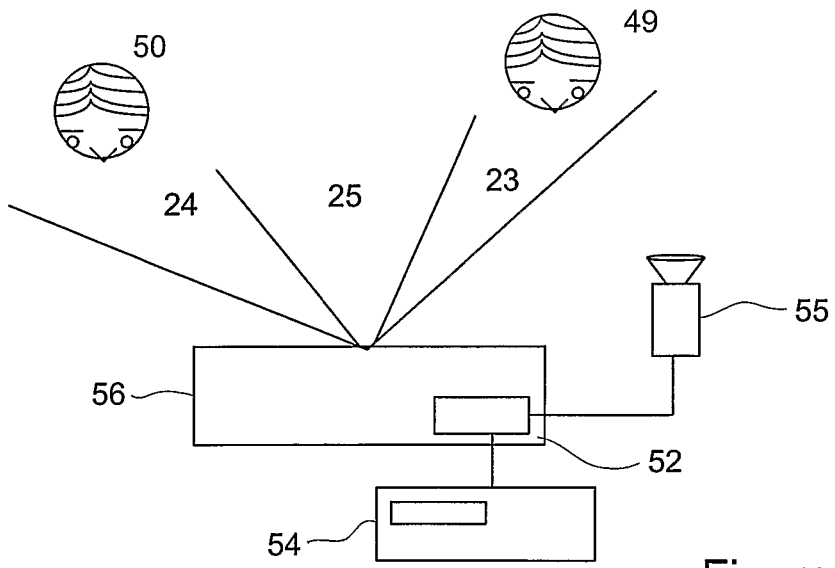
FIG. 34 depicts another display system comprising a multi-view display according to any one of the first to fifteenth embodiments.

FIG. 33 depicts another display system comprising a multi-view display 56 according to the present invention. In this figure, the processor 52, data source 54 and audio output means 55 are not shown. In this example, the display 56 is arranged to create an asymmetric arrangement of viewing zones 23, 24, so that viewing zone 23 is orientated towards one viewer 50. For example, in an automotive application, the viewing zone 23 may be directed so that the driver 50 may view said information without taking their vision off the road. The creation of an asymmetric arrangement of viewing zones 23, 24 has been discussed in relation to the fourth embodiment. However, a number of the other embodiments can also be adapted to produce such an arrangement. For example, the first, second, ninth, tenth and twelfth to fifteenth embodiments may be modified to produce asymmetrically distributed viewing zones 23, 24 by aligning the barrier 20, 26, 43, 47 and filter layer 19, 27, 41 in a suitable manner.

From reading the present disclosure, other variations and modifications will be apparent to persons skilled in the art. Such variations and modifications may involve equivalent and other features which are already known in the design, manufacture and use of display devices comprising liquid crystal display panels or other display panels and component parts thereof and which may be used instead of or in addition to features already described herein.

In particular, the above embodiments are dual-view displays that are suitable for use in automotive applications. The invention may be used to provide more than two different views simultaneously. For example, a subpixel layout providing 'A', 'B', 'C' and 'D' views in a similar manner to the ninth to thirteenth embodiments of the invention may be provided. Furthermore, the invention is not limited to multi-view displays for use in the automotive environment and can be used to present different information to multiple viewers in other applications where viewers are likely to remain within a given viewing zone. These other applications include displays in aircraft cabins, coaches, waiting rooms, lecture theatres and so on.

The features of the above embodiments have been described in relation to subpixels of the display panel 14 and, in particular, their pitch p. However, a multi-view display according to any of the above embodiments may be configured so that the pitch of any light lines lenticular screens or other parameters is instead based on the pitch p of pixels. This is particularly appropriate where the display panel 14 is a monochrome display.

As noted above, it is not necessary for the display panel 14 to be a liquid crystal device. Other display panels may also be used, which need not be of the light shutter type. Suitable alternative display panels include electrophoretic displays, electrochromic displays, electro-wetting displays and micromechanical displays, such as micro-electro-mechanical systems (MEMS) displays. In arrangements comprising front barriers, such as the first, second, fourth and fifteenth embodiments of the invention, the display panel 14 may be a light emissive display device, such as a cathode ray tube (CRT), an array of light emitting diodes, an organic light emitting diode (OLED) display, a field emissive display (FED) and so on.

The features of described in relation to separate embodiments may be combined, if appropriate. For example, although the use of a dedicated scatterer and a switchable diffuser and the configuration of viewing zones by selecting an appropriate pitch I for the light lines and a lenticular screen have been described in respect of separate embodiments, these features may be used in combination to provide their respective advantages.

In the embodiments comprising a barrier, the width w of the slits of the barrier need not be equal to the pitch p of the pixels or subpixels multiplied by a given positive integer. As described above, the width w may be less than this value, in order to improve separation of the viewing zones, or even slightly larger, in order to effect a view point correction or to obtain viewing zones of a desired size, as discussed above in relation to selected embodiments of the invention.

Furthermore, the provision of a dedicated scatterer and a switchable diffuser, in order to allow the multi-view display to be switched between multi-view and single view modes, has been discussed in relation to the seventh and eighth embodiments of the invention only. However, such a diffuser may be included in any of the other embodiments of the invention, where appropriate. Furthermore, the switchable diffuser may be operated to illuminate one area of the display panel with light lines for multiple views while simultaneously providing uniform illumination over another area of the display panel to provide a single view.

The use of a multi-view display to create an asymmetric arrangement of viewing zones has been discussed in relation to the fourth embodiment only. However, other embodiments described above may be arranged to create such an asymmetric arrangement. For example, in the second and third embodiments may be modified, so that the colour barrier and filter layer may be aligned to produce asymmetric viewing zones in a similar manner to that shown in FIG. 12. Similarly, in arrangements based on the ninth, tenth and twelfth to fifteenth embodiments of the invention, the barrier and filter layer also be aligned in such a manner.

Although Claims have been formulated in this Application to particular combinations of features, it should be understood that the scope of the disclosure of the present invention also includes any novel features or any novel combination of features disclosed herein either explicitly or implicitly or any generalisation thereof, whether or not it relates to the same invention as presently claimed in any Claim and whether or not it mitigates any or all of the same technical problems as does the present invention. The Applicants hereby give notice that new Claims may be formulated to such features and/or combinations of such features during the prosecution of the present Application or of any further Application derived therefrom.

The invention claimed is:

1. A continuous multi-view display comprising:
   a display panel, comprising a first plurality of imaging units arranged to continuously and exclusively display a first view to a first viewing zone and
   a plurality of second imaging units arranged to continuously and exclusively display a second view to a second viewing zone,
   said first imaging units and second imaging units being separated by a plurality of third imaging units; and
   an illumination arrangement configured to illuminate the display panel with a plurality of light lines, the light lines having a pitch that is substantially twice the pitch of the sub-pixels;
   the display being arranged such that said third imaging units are not used to display information when said first and second views are displayed.

2. A multi-view display according to claim 1, wherein said third imaging units are switched off when said first and second views are displayed.

3. A multi-view display according to claim 1, wherein each of said first, second and third pluralities of imaging units are arranged in columns and form part of a two dimensional array of imaging units.

4. A multi-view display according to claim 3, wherein said plurality of first imaging units comprises imaging units arranged in adjacent columns of the display panel.

5. A multi-view display according to claim 4, wherein said plurality of second imaging units comprises imaging units arranged in adjacent columns of the display panel.

6. A multi-view display according to claim 3, wherein said first, second and third pluralities of imaging units are arranged as a periodic sequence of columns in said array.

7. A multi-view display according to claim 3, wherein the display panel comprises a plurality of colour filters arranged as a two-dimensional array.

8. A multi-view display according to claim 3, wherein said display panel comprises a plurality of colour filters based on at least four primary colours.

9. A multi-view display according to claim 1, comprising:
   a light source; and
   a barrier including a plurality of light transmissive portions arranged at a given pitch, located between the light source and the display panel; and is arranged so that the display panel is illuminated by a plurality of light lines.

10. A multi-view display according to claim 1, comprising a barrier including a plurality of light transmissive portions, to selectively admit light, said light transmissive portions being arranged at a first pitch, the barrier being positioned so that light emerging from the imaging units is incident thereon.

11. A multi-view display according to claim 9, wherein said barrier is a switchable device that can be switched between a selectively transmissive mode, in which the barrier selectively admits light, and a light transmissive mode, in which the barrier is substantially light transmissive in order to provide uniform illumination for the display panel.

12. A multi-view display according to claim 9, wherein said barrier is a switchable device that can be operated in a first mode, in which the light transmissive portions are arranged with the first pitch, and a second mode, in which the light transmissive portions are arranged with a second pitch.

13. A multi-view display according to claim 11, wherein said barrier is a liquid crystal cell.

14. A multi-view display according to claim 9, wherein said display panel comprises a plurality of colour filters and wherein said barrier and said plurality of colour filters are arranged in a non-parallel configuration.

15. A multi-view display according to claim 9, wherein the illumination arrangement comprises a light source arranged to generate light lines and a lenticular screen arranged to image the light lines within the display panel.

16. A multi-view display according to claim 1, wherein light transmissive portions of the barrier and said third imaging units are aligned so that the light output by display panel creates the viewing zones in an asymmetrical arrangement.

17. A display system comprising:
   a multi-view display according to claim 1; and
   audio output means arranged to output audio signals corresponding to the information displayed in one or more of said viewing zones.

18. A multi-view display according to claim 1 or a display system according to claim 17, arranged to display information in an automotive vehicle.

19. Use of a multi-view display according to claim 1 or a display system according to claim 18 to display different information in respective ones of said viewing zones.

* * * * *